United States Patent
Harary et al.

(10) Patent No.: US 12,261,816 B2
(45) Date of Patent: *Mar. 25, 2025

(54) ADDRESS RESOLUTION INFORMATION ACQUISITION (ARIA) FOR A COMPUTING DEVICE

(71) Applicant: Texas Instruments Incorporated, Dallas, TX (US)

(72) Inventors: Eran Harary, Rosh-Haayin (IL); Yoav Ben Yehezkel, Netanya (IL); Yaniv Tzoreff, Jerusalem (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,506

(22) Filed: Aug. 16, 2023

(65) Prior Publication Data

US 2023/0396578 A1 Dec. 7, 2023

Related U.S. Application Data

(63) Continuation of application No. 17/573,674, filed on Jan. 12, 2022, now Pat. No. 11,777,896, which is a continuation of application No. 16/847,069, filed on Apr. 13, 2020, now Pat. No. 11,258,752.

(51) Int. Cl.
*H04L 29/08* (2006.01)
*H04L 29/12* (2006.01)
*H04L 61/10* (2022.01)
*H04L 67/568* (2022.01)

(52) U.S. Cl.
CPC ............ *H04L 61/10* (2013.01); *H04L 67/568* (2022.05)

(58) Field of Classification Search
CPC ..... H04L 61/10; H04L 67/568; H04L 61/103; H04L 41/0668; H04L 43/0823; H04L 43/10
USPC ......................................................... 709/245
See application file for complete search history.

(56) References Cited

U.S. PATENT DOCUMENTS

| | | |
|---|---|---|
| 6,138,162 A | 10/2000 | Pistriotto |
| 6,542,465 B1 | 4/2003 | Wang |
| 6,654,387 B1 | 11/2003 | Beser |
| 6,697,862 B1 | 2/2004 | Beser |
| 6,754,622 B1 | 6/2004 | Beser |
| 7,068,712 B1 | 6/2006 | Zang |
| 7,188,178 B2 | 3/2007 | Elonen |

(Continued)

*Primary Examiner* — Jude Jean Gilles
(74) *Attorney, Agent, or Firm* — Mandy Barsilai Fernandez; Frank D. Cimino

(57) ABSTRACT

Address resolution information acquisition (ARIA) for a computing device is described. In some examples, ARIA includes a computing device (e.g., an Internet of things (IoT) node, a gateway, a server) determining, without use of an address resolution protocol (ARP), address resolution information of one or more other computing devices (e.g., a IoT node, a gateway, a server). In one example, the computing device uses data flowing to or from its application layer, transport layer, or network layer to determine address resolution information of another computing device. The address resolution information can comprise one or more of a link layer address (e.g., a media access control (MAC) address) and an Internet layer address (e.g., an Internet protocol (IP) address). Usage of a cache for storing or deleting address resolution information can also be part of ARIA.

23 Claims, 7 Drawing Sheets

(56) References Cited

U.S. PATENT DOCUMENTS

| | | |
|---|---|---|
| 8,484,375 B2 | 7/2013 | Smith, Jr. |
| 8,831,020 B2 | 9/2014 | Ylimartimo |
| 8,832,312 B2 | 9/2014 | Tanji |
| 8,885,830 B2 | 11/2014 | Tahan |
| 8,954,591 B2 | 2/2015 | Ganesan |
| 8,995,443 B2 * | 3/2015 | Schrum, Jr. ......... H04L 12/5692 370/392 |
| 9,537,793 B2 | 1/2017 | Kapadia |
| 9,992,159 B2 | 6/2018 | Kitamura |
| 10,122,631 B1 * | 11/2018 | Priddy ................. H04L 61/103 |
| 11,777,896 B2 * | 10/2023 | Harary .................... H04L 61/10 709/245 |
| 2001/0007567 A1 | 7/2001 | Ando |
| 2002/0169886 A1 | 11/2002 | Saito |
| 2004/0215717 A1 | 10/2004 | Seifert |
| 2006/0174031 A1 | 8/2006 | Yamakoshi |
| 2010/0325257 A1 | 12/2010 | Goel |
| 2014/0025770 A1 | 1/2014 | Warfield |
| 2014/0219077 A1 * | 8/2014 | Zhou ....................... H04L 12/66 370/217 |
| 2014/0304294 A1 | 10/2014 | Sharma |
| 2015/0341307 A1 * | 11/2015 | Page ....................... H04L 45/60 370/392 |
| 2015/0350043 A1 * | 12/2015 | Kovács ................. H04L 61/103 370/245 |
| 2017/0147656 A1 | 5/2017 | Choudhary |
| 2017/0373890 A1 | 12/2017 | Fertonani |
| 2018/0006995 A1 | 1/2018 | Bickhart |
| 2019/0005148 A1 * | 1/2019 | Lam ...................... H04W 28/16 |
| 2020/0089617 A1 * | 3/2020 | Onishi ................ G06F 12/0246 |
| 2020/0177442 A1 | 6/2020 | Zhang |

\* cited by examiner

ADDRESS RESOLUTION INFORMATION ACQUISITION (ARIA) FOR A COMPUTING DEVICE

CROSS-REFERENCE TO RELATED APPLICATIONS

This application is a continuation of U.S. patent application Ser. No. 17/573,674, filed Jan. 12, 2022, which is a continuation of U.S. patent application Ser. No. 16/847,069, filed Apr. 13, 2020, now U.S. Pat. No. 11,258,752, which applications are hereby incorporated herein by reference.

BACKGROUND

An Internet of Things (IoT) system is a system of interconnected computing devices that are provided with unique identifiers (UIDs) and have the ability to transfer data over a network. One example of an IoT system includes: (i) computing devices (e.g., one or more IoT nodes, one or more gateways, one or more servers, or any device or devices that communicate using the network); and (ii) one or more networks (e.g., an intranet, an Internet. or any other medium that allows computing devices to transfer data).

An IoT node is an example computing device for an IoT system. The IoT node includes one or more of the following: (i) computing devices; (ii) components (e.g., actuators); and (iii) software. A computing device, such as an IoT node, can operate through a network to transfer data to and from other computing devices (including, for example, another IoT node, a gateway, a server). In one scenario, a computing device (e.g., an IoT node, a gateway, a server) may perform a traditional address resolution procedure that includes communicating with other computing devices in a system comprising one or more networks using a specialized protocol (e.g., an address resolution protocol (ARP)). In this scenario, the traditional address resolution procedure is used to obtain address resolution information associated with at least one of the other computing devices. An ARP is a communication protocol used for discovering address resolution information for a computing device in a system comprising one or more networks. Address resolution information, which comprises a link layer address and an Internet layer address that is associated with a computing device, is stored in one or more caches of one or more computing devices in the system. A link layer address is a UID assigned to a computing device to enable data transfer between the computing device and other computing devices. An example of link layer address is a media access control (MAC) control address, which is sometimes called a physical address or a hardware address. A MAC address is a UID assigned to a computing device's network interface controller (NIC) to identify the computing device in a network for data communications between the computing device and other computing devices associated with the network. An Internet layer address is a UID assigned to a computing device that enables data, such as network packets, to be communicated to or from the computing device in accordance with the Internet protocol (IP) suite. One example of an Internet layer address is an IP address, which is a numeric UID assigned to a computing device connected to a network that uses the IP suite for data communication.

A computing device (e.g., an IoT node) that is performing a traditional address resolution procedure may consume a large amount of power. Given that some of these types of computing devices (e.g., one or more IoT nodes) are expected to operate for an extended period of time (e.g., days, weeks, months, years), the power consumption by computing devices performing traditional address resolution procedures can have an impact on the life spans of the computing devices.

Furthermore, some computing devices (e.g., one or more IoT nodes) that can perform traditional address resolution procedures have limited memory footprints. In a system comprising many (e.g., tens, hundreds, thousands, millions) computing devices, maintaining address resolution information associated with the computing devices in one or more caches can be difficult, complicated, or unfeasible.

SUMMARY

The examples provided below are directed to address resolution information acquisition (ARIA), which may, in some examples, be performed by a computing device in a system (e.g., an IoT system) that comprises one or more networks (e.g., an intranet, the Internet). Examples of such a computing device include an Internet of things (IoT) node, a gateway, a server, or any other computing device in the system that is capable of data communication.

In one example of ARIA, a first computing device comprises communication circuitry configured to transmit and receive information and processing circuitry coupled to the communication circuitry. In this example, the processing circuitry is configured to obtain, using the communication circuitry, first data associated with a second computing device from a wireless transmission comprising the first data. The wireless transmission, in this example, is received by or transmitted from an application layer, a transport layer, or a network layer of an open systems interconnection model (OSI) characterizing the first computing device. Furthermore, the processing circuitry is configured to determine second data comprising address resolution information of the second computing device based, at least in part, on the first data obtained from the wireless transmission.

In another example of ARIA, one or more non-transitory computer readable media comprise instructions that are executable by one or more processors of a first computing device to obtain, using communication circuitry, first data associated with a second computing device from the wireless transmission comprising the first data. In this example, the wireless transmission is received by or transmitted from an application layer, a transport layer, or a network layer of an open systems interconnection model (OSI) characterizing the first computing device. Furthermore, the one or more non-transitory computer readable media comprise instructions that are executable by the one or more processors to determine second data comprising address resolution information of the second computing device based, at least in part, on the first data obtained from the wireless transmission.

In yet another example of ARIA, a method performed by a first computing device includes obtaining first data associated with a second computing device from the wireless transmission comprising the first data. In the method, the wireless transmission is received by or transmitted from an application layer, a transport layer, or a network layer of an open systems interconnection model (OSI) characterizing the first computing device. The method further includes determining second data comprising address resolution information of the second computing device based, at least in part, on the first data obtained from the wireless transmission.

BRIEF DESCRIPTION OF THE DRAWINGS

For a detailed description of various examples, reference will now be made to the accompanying drawings in which.

DETAILED DESCRIPTION

The examples provided below are directed to address resolution information acquisition (ARIA) that can be used or performed by a computing device. Examples of a computing device include an Internet of things (IoT) node, a gateway, and a server. One or more examples of ARIA described herein may serve the same function as a traditional address resolution procedure that uses a specialized protocol (e.g., an address resolution protocol (ARP)) to determine or acquire address resolution information. For example, a computing device can use one or more examples of ARIA described herein to discover, obtain, or determine address resolution information, such as a link layer address and an Internet layer address of another computing device. In one example, the link layer address is a media access control (MAC) address and the Internet layer address is an Internet protocol (IP) address (e.g., an IP version 4 (IPv4) address). In one example, one or more examples of ARIA described herein translates an IPv4 address into a MAC address or an IP version 6 (IPv6 address) into a MAC address.

The ARIA protocol may provide one or more benefits. For example, such benefits include reduction of the usage of cache resources, which can in turn minimize the power consumed by a computing device performing the ARIA protocol (when compared to the computing device performing a traditional address resolution procedure). In this example, the savings in power consumption can, in turn, improve the life span of a computing device. This is particularly important in computing devices that are expected to operate on power sources (e.g., batteries) for long periods of time (e.g., days, weeks, months, years). As another benefit, performance of one or more examples of ARIA described herein can make cache usage more efficient than a traditional address resolution procedure's cache usage. This relatively efficient usage of the cache that is attributable to performing one or more examples of ARIA described herein can address one or more of the shortcomings associated with cache usage during performance of a traditional address resolution procedure, such as a traditional address resolution procedure that includes use of an ARP. For example, the relatively efficient cache usage described above can assist with or make it feasible to maintain address resolution information in one or more caches of computing devices that have limited memory footprints (e.g., an IoT node, a gateway, a server).

Figure 1:
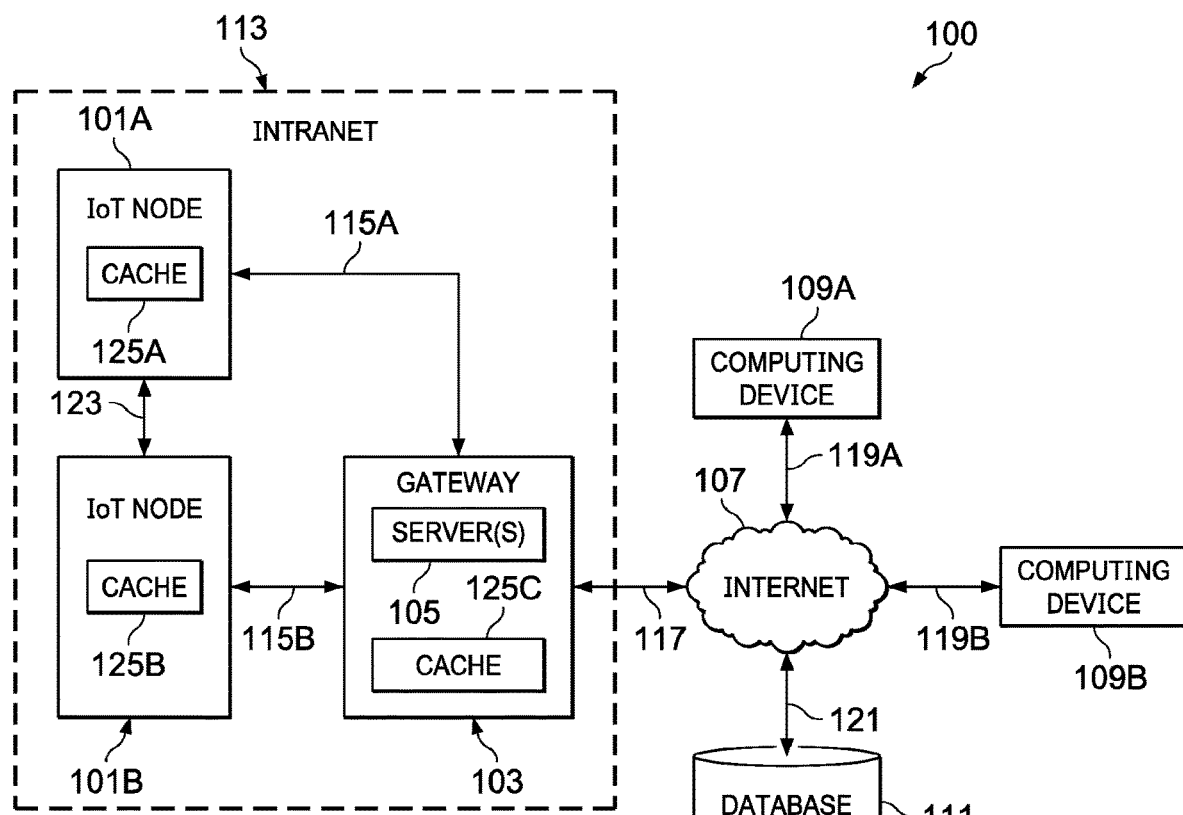
FIG. 1 is an illustration of an example system architecture comprising one or more networks and computing devices.

FIG. 1 illustrates an example architecture of a system 100 comprising a plurality of computing devices that are capable of communicating with each other using one or more networks. In one example, the system 100 is an Internet of things (IoT) system 100. For illustrative purposes, the system 100 may be referred to as an IoT system 100 that comprises one or more computer networks, a database 111, and computing devices 109A-109B. In this example, the networks include an intranet 113 and the Internet 107.

In some examples, the intranet 113 is a network with restricted access that uses software and protocols developed for the Internet. In certain embodiments, the intranet 113 is a network that can be accessed only by authorized users. Examples of the intranet 113 comprise a local area network (LAN), a wireless LAN (WLAN), a wide area network (WAN), and a metropolitan area network (MAN). As shown in FIG. 1, the intranet 113 may comprise IoT nodes 101 and a gateway 103. The IoT nodes 101 are collectively referred to as IoT nodes 101.

Each of the IoT nodes 101 includes one or more computing devices, memory, and a power source. The power source for each IoT node 101 may be a battery. In one example, at least one of the IoT nodes 101 is a low-power IoT device capable of operating for extended periods of time (e.g., days, weeks, months, years) on a battery.

In one example, at least one of the IoT nodes 101 is a limited memory footprint IoT device that has a limited or small memory (e.g., random access memory (RAM), read only memory (ROM), any other type of memory). In one example, the memory of a given IoT node 101 is located within the IoT node itself. In another example, the memory used by a given IoT node 101 is remotely located from the IoT node. In this latter example, the IoT node 101 accesses the remotely-located memory via one or more communication technologies (e.g., a wired or wireless connection, Bluetooth, Ethernet, Wi-Fi®, a connection consistent with any IEEE 802.11 protocol). In one example, the memory used by the IoT nodes 101 includes caches 125A-125B, respectively. One example of each of the caches 125A-125B is an ARP cache that is used to store or delete data comprising address resolution information.

An IoT node 101 also may include a computing device (e.g., hardware processor, processing circuitry, and the like). An IoT node 101 also may include one or more of a sensor, an actuator, and a wireless radio. In one example, at least one of the IoT nodes 101 is configured, among others, to capture and process data about itself, its environment, or an object associated with the IoT node.

At least one of the IoT nodes 101 can be a machine-type communications (MTC) device, an enhanced Machine Type Communication (eMTC) device, a Narrowband IoT (NB-IoT) device, a further enhanced narrowband internet-of-things (feNB-IoT) device, a machine-to-machine (M2M) device, or any other type of IoT device. Further example implementations of each IoT node 101 are provided in FIGS. 9 and 10 and described below.

Each of the IoT nodes 101 is assigned a unique identifier (UID). In one example, a UID is a medium access control (MAC) address. The MAC addresses of the IoT nodes 101 are assigned to a network interface controller (NICs) associated with the IoT nodes 101 to enable data communications within a network (e.g., the intranet 113, the Internet 107). The MAC addresses of the IoT nodes 101 can be pre-assigned by the manufacturer or manufacturers of the NICs associated with the IoT nodes 101.

In one scenario, one or more of the IoT nodes 101 operates via a network to transfer data to and from the other one of the IoT nodes 101 and the gateway 103. In one scenario, the IoT nodes 101 may communicate data with each other via a communication channel 123. The communication channel 123 may be based on one or more communication technologies, including, for example, a wired or wireless connection, Bluetooth, Ethernet, Wi-Fi®, a connection consistent with any IEEE 802.11 protocol.

In one example, one or both of the IoT nodes 101 complies with the open systems interconnection (OSI) model, which comprises seven abstraction layers. In this example, one or both of the IoT nodes 101 can communicate using one or more technologies (e.g., one or more protocols) associated with one or more of the seven layers and operate at any of the seven layers of the OSI model. An example OSI model is described below in connection with FIG. 2.

As shown in FIG. 1, the IoT nodes 101 are communicatively coupled to a gateway 103. Communications between the IoT nodes 101 and the gateway 103 occur via the respective communication channels 115A-115B. Each of the communication channels 115A-115B can be similar to or the same as the communication channel 123 described above in connection with the IoT nodes 101.

In one scenario, the gateway 103 is a network element that is capable of performing one or more of the following: (i) allowing data to flow from one network to another; and (ii) allowing devices (e.g., wireless devices, wired devices) to connect to a network (e.g., a wired network, a wireless network). In one example, the gateway 103 also complies with the OSI model. In this example, the gateway 103 communicates using one or more technologies (e.g., one or more protocols) associated with one or more of the OSI layer's seven layers and operates at any of the OSI layer's seven layers. In one example, the gateway 103 includes one or more servers 105, which may be implemented using hardware or a combination of hardware and software. In one example, the server(s) 105 implement protocols that enable generating or communicating one or more unicast, broadcast, or multicast transmissions. Such transmissions(s) comprise data such as data associated with one or more computing devices (e.g., the IoT node 101A, the IoT node 101B, the gateway 103, or one or more other computing devices that are associated with or included in the IoT system 100). In one example, the server(s) 105 include a server (e.g., a dynamic host configuration protocol (DHCP) server) configured to assign an address, such as an Internet layer address, to one or more of the computing devices in or associated with the IoT system 100 (e.g. one or both of the IoT nodes 101, the gateway 103). In another example, the server(s) 105 include a server (e.g., a multicast domain name system (mDNS) server) configured to request and receive an address, such as an Internet layer address, from one or more of the computing devices in or associated with the IoT system 100 (e.g. one or both of the IoT nodes 101, the gateway 103). In yet another example, the server(s) 105 include a server (e.g., a service discovery protocol (SDP) server) configured to perform a service discovery procedure. The gateway 103 shown in FIG. 1 includes one or more servers 105 within the gateway 103. In another example, at least one of the servers 105 can reside or exist outside of the gateway 103.

As shown in FIG. 1, the gateway 103 is communicatively coupled to the Internet 107. In one example, communications between the gateway 103 and the Internet 107 occur via the communication channel 117. The communication channel 117 can be based on one or more communication technologies including, for example, a wired or wireless connection, Bluetooth, Ethernet, Wi-Fi®, a connection consistent with any IEEE 802.11 protocol.

The IoT system 100 may also include computing devices 109A-109B, each of which can communicate data to or from the gateway 103 and/or the database 111 via the Internet 107. As shown, the computing devices 109A-109B communicate with the Internet 107 via communication channels 119A-119B, respectively. The communication channels 119A-119B can be similar to or the same as the communication channel 117 described above. In one example, one or both of the computing devices 109A-109B is similar to or the same as any of the IoT nodes 101. Thus, at least one example of ARIA described herein can be performed by one or more of the computing devices 109A-109B.

The computing devices 109A-109B can be smartphones (e.g., handheld touchscreen mobile computing devices connectable to one or more networks) or any mobile or non-mobile computing device, such as consumer electronics devices, feature phones, tablet computers, wearable computer devices, personal digital assistants (PDAs), pagers, wireless handsets, desktop computers, laptop computers, in-vehicle infotainment (IVI) systems, in-car entertainment (ICE) devices, an Instrument Cluster (IC), heads-up display (HUD) devices, onboard diagnostic (OBD) devices, dashtop mobile equipment (DME), mobile data terminals (MDTs), electronic engine management systems (EEMSs), electronic/engine control units (ECUs), electronic/engine control modules (ECMs), embedded systems, microcontrollers, control modules, engine management systems (EMS), networked or "smart" appliances, or the like.

A database 111 includes data that can be accessed by, written to, or read by one or more of the IoT node 101A, the IoT node 101B, the gateway 103, the computing device 109A, and the computing device 109B via the Internet 107 over the communication channel 121. The communication channel 121 can be similar to or the same as the communication channel 117 described above in connection with the gateway 103.

In one scenario, a computing device, such as an IoT node 101, the gateway 103, or a server 105 may use a traditional address resolution procedure that includes the computing device using a specialized protocol (e.g., an ARP) to communicate with one or more other computing devices in a system. An ARP is a communication protocol used for discovering address resolution information. Such address resolution information is stored in a cache (e.g., an ARP cache) of a computing device.

As explained above, traditional address resolution procedures, can in some scenarios, have several shortcomings. The examples of ARIA described herein are performed by a computing device, such as the IoT node 101A, the IoT node 101B, the gateway 103, or a server 105, to reduce or eliminate one or more of the shortcomings associated with traditional address resolution procedures. The description provided below sometimes focuses on the IoT node 101A, however, any description that is applicable to the IoT node 101A is also applicable to the IoT node 101B. Furthermore, any operations or actions that can be performed by the gateway 103 can also be performed by one or more of the servers 105.

As used herein. "address resolution information acquisition (ARIA)" and its variations refer to one or more operations performed by a computing device (e.g., an IoT node 101, a gateway 103, a server 105) to obtain or determine address resolution information of the computing device itself or one or more other computing devices without the use of an ARP or a traditional address resolution procedure. One or more examples of ARIA described herein includes using data flowing to or from an application layer, a transport layer, or a network layer of an open systems interconnection (OSI) characterizing a computing device to determine address resolution information. Accordingly, ARIA is unlike an ARP or a traditional address resolution procedure, which uses data flowing to or from a data link layer to determine address resolution information. In one example, address resolution information of a computing device comprises one or more of: (i) a link layer address associated with the computing device; and (ii) an Internet layer address associated with the computing device.

In one example, and with regard to FIG. 1, the IoT node 101A performs an example of ARIA to obtain or determine address resolution information of another computing device in the system 100 (e.g., the IoT node 101B, the gateway 103). In one example, the example ARIA includes the IoT node 101A obtaining or determining data (e.g., data comprising address resolution information) that is communicated between two or more of the IoT node 101A, the IoT node 101B, and the gateway 103. In one example, communicating the data includes communicating data between two or more of the IoT node 101A, the IoT node 101B, and the gateway 103 using one or more transmissions. In the preceding example, the transmission(s) include one or more unicast communications, one or more broadcast communications, or one or more multicast communications. In one example, the IoT node 101A processes or is configured to process the data included in the one or more transmissions described above to obtain or determine data (e.g., data comprising address resolution information) that is associated with one or more of the IoT node 101B and the gateway 103. In one example, the IoT node 101A writes or is configured to write data comprising the address resolution information to a cache of the IoT node 101A. In one example, the IoT node 101A performs or is configured to perform at least one deletion operation to delete data comprising the address resolution information from a cache of the IoT node 101A.

One or more of the unicast, broadcast, or multicast transmissions described herein may be generated or communicated in accordance with one or more protocols. Examples of protocols associated with unicast transmissions include (i) a TCP; (ii) an ICMP; and (iii) any other suitable protocol that is associated with one or more layers of an OSI model and capable of unicasting transmissions. Examples of protocols associated with broadcast or multicast transmissions include (i) an SDP used to perform a service discovery procedure; (ii) a DHCP; (iii) an mDNS protocol; and (iv) any other suitable protocol that is associated with one or more layers of an OSI model and capable of broadcasting or multicasting one or more transmissions. The protocols may be implemented by the IoT node 101A, the IoT node 101B, or the gateway 103. In one example, generating or communicating the one or more unicast, broadcast, or multicast transmissions includes the protocols detecting or acquiring data (e.g., data comprising address resolution information) associated with the IoT 101A, the IoT 101B, or the gateway 103. The data detected or acquired by the protocols may be communicated between two or more of the IoT node 101A, the IoT node 101B, and the gateway 103 using the broadcast or multicast transmissions described above.

In one example of ARIA, the IoT node 101A obtains or determines data (e.g., address resolution information) that is associated with one or more of the IoT node 101B and the gateway 103 by data sniffing one or more transmissions comprising data that is communicated to or from one or more of the IoT node 101A, the IoT node 101B, and the gateway 103. Such transmissions can be directed to or from the IoT node 101B and the gateway 103 or directed to the IoT node 101A. In one example, the IoT node 101A comprises a data sniffer implemented as a combination of software and hardware. As used herein, "data sniffing," "sniffing," "snooping," and their variations refer to capturing data (e.g., one or more segments, one or more datagrams, one or more packets) flowing in a system 100 without modifying the captured data. Data sniffing makes it possible to obtain or determine data, such as address resolution information, one or more protocols being used in the system 100, or other information associated with the system 100.

After the IoT node 101A (e.g., or its data sniffer) performs data sniffing, the example of ARIA described herein includes the IoT node 101A processing the sniffed data to obtain or determine data that includes the address resolution information associated with one or more of the IoT node 101B and the gateway 103. In one example, the IoT node 101A writes or is configured to write data comprising the address resolution information to a cache of the IoT node 101A. In one example, the IoT node 101A performs or is configured to perform at least one deletion operation to delete data comprising the address resolution information from a cache of the IoT node 101A.

In traditional address resolution procedures, data comprising address resolution information is stored as entries in a cache (e.g., an ARP cache). A cache flush can be used to remove the data from the cache so that the cache can store additional data comprising additional address resolution information as additional entries in the cache. In traditional address resolution procedures, the cache is flushed to remove an entry in response to a determination that the entry has not been used for a predetermined amount of time, which is sometimes referred to as an ARP timeout or an ARP cache entry timeout. Cache usage in traditional address resolution procedures has several shortcomings. One shortcoming associated with the such cache usage is that stale entries are not removed until the ARP timeout expires. In some scenarios, waiting until the ARP timeout expires can have a negative impact on the resources of a computing device performing the traditional address resolution procedure. For example, the amount of resources (e.g., power consumption, processing power, memory) associated with waiting for the ARP timeout to expire may prolong the time that the computing device remains operational. This prolonged operational time can negatively affect the life span of the computing device. Another shortcoming of a traditional address resolution procedure is that the traditional cache usage may not be feasible in a system comprising a large number of the computing devices in which each device has a limited memory cache.

Examples of ARIA described herein includes usage of a computing device's cache (e.g., the cache 125A-125C) in a way that overcomes one or more of the shortcomings described above in connection with a traditional address resolution procedure. In one example of ARIA, a cache (e.g., the cache 125A, the cache 125B, the cache 125C) is flushed based on a data hierarchy. In one example, the data hierarchy prioritizes data (e.g., one or more entries comprising address resolution information) in the cache 125A according to the data's usage. For example, a data hierarchy may organize data into high priority data and low priority data. In this example, the high priority data in the cache comprises data (e.g., one or more entries comprising address resolution information) that has been successfully included in data transmissions and/or used within a predetermined amount of time. The low priority data comprises one or more of: (i) data (e.g., address resolution information) that was opportunistically determined using one or more examples of ARIA described herein; (ii) data that has not been used, accessed, or communicated in a predetermined amount of time; (iii) data that has been flagged by an aging protocol; and (iv) any other data that does not fit the description of high priority data provided above. Opportunistically determining data comprising address resolution information associated with a computing device is described below in connection with one, some, or all of FIGS. 1-8.

In one example, the cache is flushed based on a data hierarchy as follows: the data in the cache having the lower priority is deleted from the cache before the data having the higher priority is deleted from the cache. In this example, a computing device (e.g., any one of the IoT nodes 101, the gateway 103) performs the deletion operation(s) in response to the computing device determining that the cache is full or that space is needed in the cache to store additional data (e.g., additional address resolution information). In some scenarios, the deletion operation(s) may be performed even if the cache is full and a determination has not been made or does not indicate that space is needed in the cache. For example, the cache may be flushed after a predetermined amount of time elapses. For another example, the cache may be flushed after the computing device determines that a predetermined amount of low priority data stored in the cache exceeds a threshold amount. For one more example, the cache may be flushed after the computing device determines that a predetermined amount of high priority data stored in the cache falls below a threshold amount. The cache usage described above differs from the traditional usage of a cache in a traditional address resolution procedure because the cache usage prioritizes entries that are actually being communicated, accessed, or used by a computing device over entries that were opportunistically determined by the computing device using one or more examples of ARIA described herein and entries that are not being communicated, accessed, or used by the computing device. Flushing the cache based on a data hierarchy can provide one or more benefits to computing devices that have limited memory footprints. As one example, flushing a cache based on a data hierarchy, which differs from the cache usage associated with a traditional address resolution procedure, can assist with or enable a computing device that has a limited memory footprint to use its cache to store high priority data (e.g., data that is actually being communicated, accessed, or used by the computing device) instead of low priority data, which is not used by the device as often.

In another example of ARIA, a cache is flushed in response to the computing device determining information about an occurrence of one or more errors associated with communicating data (e.g., data comprising address resolution information) in the IoT system 100. Such errors can include: (i) an error that occurs during communication of data between two or more computing devices that results in communication of erroneous or incomplete data; (ii) an interruption in the communication of data between two or more computing devices that result in delivery or erroneous or incomplete data; (iii) a packet loss associated with communicating data (e.g., packet(s), datagram(s)) between two or more computing devices; or (iv) a prohibited or improper transmission of data between two or more computing devices. A specific example of the errors described above includes a failed communication of data comprising address resolution information of one or more of the IoT node 101A, the IoT node 101B, and the gateway 103 to a destination (e.g., any of the computing devices in the IoT system 100). Another example of the errors described above includes an interrupted communication of data comprising the address resolution information of one or more of the IoT node 101A, the IoT node 101B, and the gateway 103 between computing devices in the system 100. An example of the errors includes a packet loss that occurs during communication of data comprising the address resolution information associated with one or more of the IoT node 101A, the IoT node 101B, and the gateway 103 to a destination (e.g., the IoT node 101A, the gateway 103, the IoT node 101B). In one example, the errors described above can comprise one or more notifications about transmission(s) associated with the errors.

In one example, the errors described above are detected at one or more layers of an OSI model that characterizes or represents a computing device (e.g., the IoT node 101A, the IoT node 101B, the gateway 103, one or more of the other computing devices in or associated with the IoT system 101, any combination thereof). For example, the errors are detected at the IP level from upper layer indications. Examples of such detected errors include an error associated with an Internet control message protocol (ICMP), an error associated with a transmission control protocol (TCP), an error associated with one or more protocols that are associated with one or more layers of an OSI model and capable of unicasting one or more transmissions, any combination thereof, etc.

In yet another example, the cache (e.g., any one of the caches 125A-125C) is flushed in response to a computing device determining that data comprising address resolution information associated with one or more computing devices has not been communicated, accessed, or used after a predetermined amount of time. This determination may be made using an aging protocol (e.g., an aging protocol associated with a traditional address resolution procedure). Two or more of the flushing techniques described above may be combined.

One example of ARIA includes the IoT node 101A communicating wireless transmissions (e.g., unicast transmission(s), broadcast transmission(s), multicast transmission(s)) comprising data within a system (e.g., the IoT system 100). In one example, some or all of the wireless transmission(s) are received by one or more of the IoT node 101B, the gateway 103, and at least one other computing device in the system 100. In one example, at least one of the computing devices that receives some or all of the transmission(s) may or may not be the intended recipient of some or all of the transmission(s).

The IoT node 101A then receives data from at least one of the computing devices that receives some or all of the transmission(s) sent by the IoT node 101A. The data sent to the IoT node 101A can comprise data indicative of one or more errors associated with some or all of the IoT node 101A's transmission(s). Examples of these error(s) are described above.

In one example, the IoT node 101A can process the data it receives to determine data comprising address resolution information of at least one computing device in the system 100 (e.g., one or more of the computing devices that received some or all of the transmission(s) communicated by the IoT node 101A, at least one other computing device in the system 100 that did not receive the transmission(s) communicated by the IoT node 101A). The determination, in one example, can include processing the one or more error(s) alluded to above. The example of ARIA further includes the IoT node 101A adding or deleting some or all of the determined address resolution information to or from a cache of the IoT node 101A, respectively.

One instance of the example ARIA described above includes the IoT node 101A (which is or comprises a TCP client) unicasting data to the IoT node 101B (which is or comprises a TCP server). In this example, the IoT node 101B transmits data to the IoT node 101A in response to the IoT node 101B receiving the unicasted data sent by the IoT node 101A. The data received by the IoT node 101A comprises an error indicating that some or all of the unicasted data was rejected by the IoT node 101B because the IoT node 101B closed the connection (e.g., a socket) between the IoT nodes 101 before some or all of the unicasted data was received by the IoT node 101B. Next, the IoT node 101A determines data comprising the IoT node 101B's address resolution information from some or all of the data comprising or representative of the error described above. Subsequently, the IoT node 101A performs a deletion operation to delete one or more entries comprising some or all of the data comprising the address resolution information from a cache of the IoT node 101A.

Another instance of the example ARIA described above includes the IoT node 101A unicasting data (which can be or includes a ping request) in a system (e.g., the IoT system 100). In this example, the gateway 103 (which can, for example, be or comprise a router) receives some or all of the unicasted data (e.g., the ping request). The gateway 103, in one example, is not an intended recipient of the unicasted data. In this example, the gateway 103 receives the ping request because one or more of the intended recipients cannot be found. In one example, the gateway 103 transmits data to the IoT node 101A after the gateway 103 receives the ping request from the IoT node 101A. The data received by the IoT node 101A comprises or represents an error indicating that one or more of the intended recipients of the unicasted data is unreachable. Next, the IoT node 101A determines, from some or all of the data comprising or representative of the error described above, data comprising the gateway 103's address resolution information or data comprising at least one of the intended recipient's address resolution information. In one example, the IoT node 101A performs at least one deletion operation to delete one or more entries comprising some or all of data comprising the address resolution information from a cache of the IoT node 101A. In another example, the IoT node 101A performs at least one addition operation to add one or more entries comprising some or all of the data comprising the address resolution information from the cache. In a specific example, the IoT node 101A performs one or more of: (i) at least one deletion operation to delete data comprising the intended recipient's address resolution information from the cache; and (ii) at least one addition operation to add data comprising the gateway 103's address resolution information to the cache.

In yet another instance of the example ARIA described above, the IoT node 101A unicasts data that cannot be processed or used by the IoT node 101B to the IoT node 101B. This data can include, for example, data that is too large, too complex, or too erroneous for the IoT node 101B to process or use. In one example, the IoT node 101B communicates data to the IoT node 101A comprising an error indicating that the IoT node 101B cannot process or use the unicasted data. The IoT node 101A determines data comprising the IoT node 101B's address resolution information from some or all of the data comprising the error. Next, the IoT node 101A performs at least one deletion operation on one or more entries comprising some or all of the data comprising the address resolution information to delete at least one of the one or more entries from a cache of the IoT node 101A.

Figure 2:
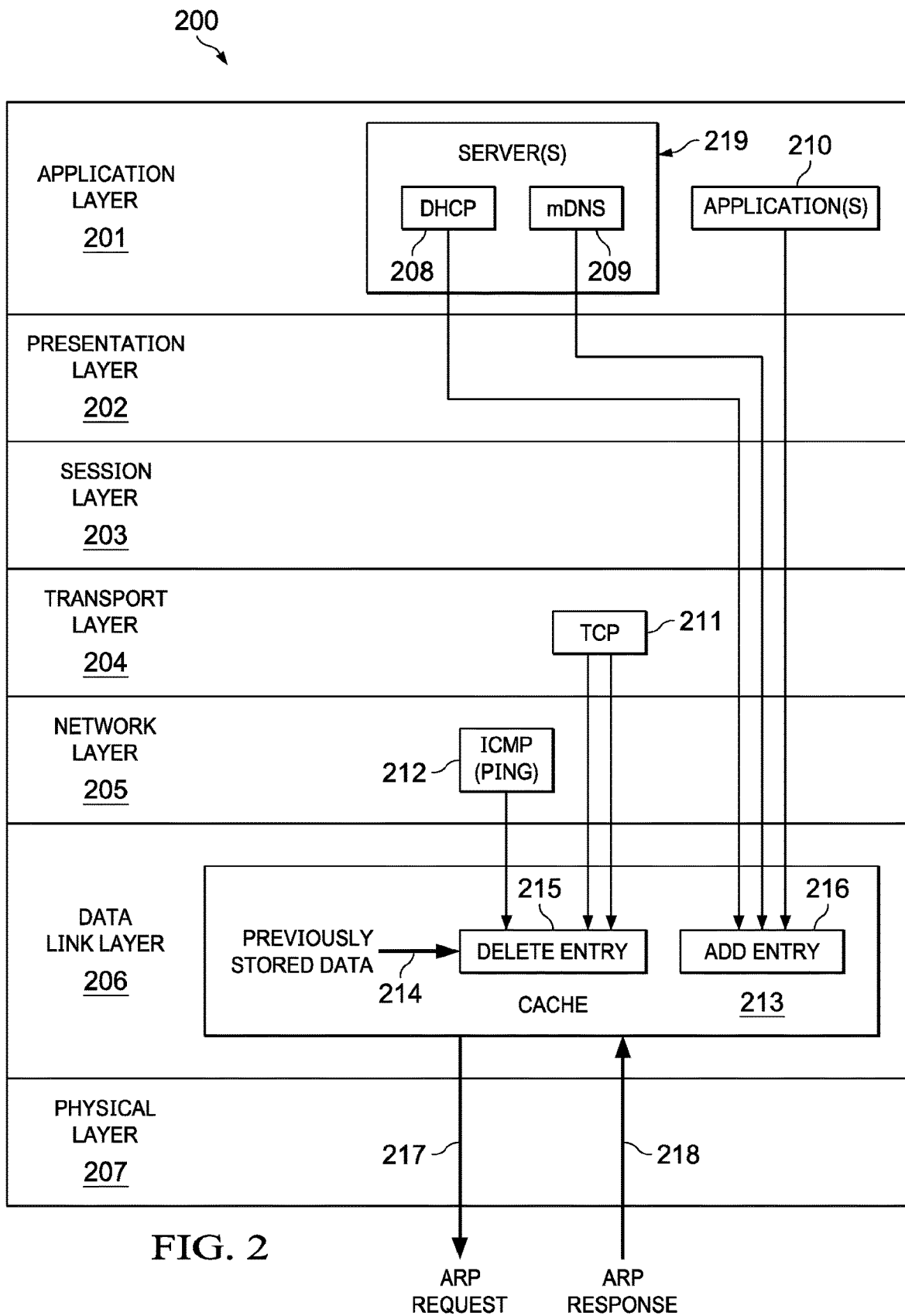
FIG. 2 is a schematic illustration of an open systems interconnection (OSI) model characterizing functions of a computing device configured to perform an address resolution information acquisition (ARIA).

FIG. 2 illustrates an OSI model 200 characterizing functions (e.g., communication functions) of a computing device configured to perform one or more examples of ARIA described herein, in accordance with some examples. The computing device described below in connection with FIG. 2 can, for example, include any one of the IoT nodes 101 or the gateway 103 described above in connection with FIG. 1.

A network (e.g., the intranet 113, the Internet 107) is built on a stack of technologies (e.g., one or more protocols or technical standards implemented by software, hardware, or any combination thereof). An OSI model (e.g., OSI model 200) is an abstract model that describes a stack of seven protocol layers 201-207. An OSI model can represent or correspond to a computing device. Each of the layers 201-207 includes one or more technologies associated with the layer that are used to realize one or more functions of the layer. The one or more technologies can process data, communicate data, perform any other action or operation that can be applied to data, associated with data, or performed on data. In one example, the one or more technologies communicate data between two or more layers 201-207 of the OSI model 200. In another example, the one or more technologies communicate data between two or more OSI models (e.g., OSI model 200), where each OSI model is associated with a distinct computing device. The description provided below in connection with FIG. 2 includes specific examples of servers or protocols (e.g., one or more servers 219 (e.g., a DHCP 208, an mDNS 209), application(s) 210, TCP 211, ICMP 212). In one scenario, the description provided below in connection with FIG. 2 applies to one or more technologies (e.g., one or more protocols, one or more servers) that are associated with one or more layers of an OSI model and capable of: (i) unicasting one or more transmissions; (ii) broadcasting one or more transmissions; or (iii) capable of multicasting one or more transmissions.

As shown in FIG. 2, from the top of the OSI model 200 to the bottom of the OSI model 200, the seven layers of the OSI model 200 are: (i) an application layer 201; (ii) a presentation layer 202; (iii) a session layer 203; (iv) a transport layer 204; (v) a network layer 205; (vi) a data link layer 206; and (vii) a physical layer 207. Each of the layers 201-207 is capable of one or more of the following: (i) communicating data to an adjacent one of the layers 201-207; (ii) receiving data from an adjacent one of the layers 201-207; (iii) processing data; (iv) performing any other action or operation that can be applied to data, associated with data, or performed on data; and (v) any combination thereof.

A computing device, which corresponds to or is represented by the OSI model 200, can include the IoT node 101A, the IoT node 101B, the gateway 103, any other computing device capable of communicating data using unicast transmissions, broadcast transmissions, or multicast transmissions. The computing device in this scenario includes one or more technologies that perform or are configured to perform one or more of: (i) a traditional address resolution procedure, which is described above in connection with FIG. 1; and (ii) one or more examples of ARIA described herein.

The description provided below in connection with FIG. 2 uses the IoT node 101A as one example of a computing device that can perform or be configured to perform one or more of: (i) a traditional address resolution procedure; and (ii) one or more examples of ARIA described herein. The description provided below in connection with FIG. 2 also uses the IoT node 101B as one example of the computing device whose address resolution information is requested or determined.

With regard to the traditional address resolution procedure shown in FIG. 2, and in one scenario, the computing device corresponding to the OSI model 200 (e.g., the IoT node 101A) transmits an ARP request 217 to another computing device (e.g., the IoT node 101B, the gateway 103) via the data link layer 206 and the physical layer 207. The ARP request 217 includes a request for address resolution information of the other computing device (e.g., the IoT node 101B, the gateway 103). In some scenarios, the computing device corresponding to the OSI model 200 (e.g., the IoT node 101A) initiates the process of creating an entry in the cache 213 in response to transmitting the ARP request 217.

Furthermore, and in one scenario, the computing device corresponding to the OSI model 200 (e.g., the IoT node 101A) receives an ARP response 218 from another computing device (e.g., the IoT node 101B, the gateway 103) via the data link layer 206 and the physical layer 207. The ARP response 218 includes a response that has address resolution information of the other computing device (e.g., the IoT node 101B, the gateway 103). In some scenarios, the computing device corresponding to the OSI model 200 (e.g., the IoT node 101A) initiates the process of storing an entry in the cache 213 in response to receiving the ARP response 218.

As shown in FIG. 2 and described above, a traditional address resolution procedure (e.g., an ARP) uses data flowing to or from a data link layer 206 to determine address resolution information of a computing device. In contrast, and as described in more detail below, one or more examples of ARIA described herein includes using data flowing to or from an application layer 201, a transport layer 204, or a network layer 205 of the OSI characterizing a computing device to determine address resolution information. Accordingly, and for at least this reason alone, ARIA is unlike a traditional address resolution procedure (e.g., an ARP).

At least one example of ARIA described herein begins at the application layer 201. As shown, the application layer 201 includes one or more technologies (e.g., one or more servers 219, one or more applications 210) that can, among others, provide or be configured to provide resources, data, services, or programs to a client. Examples of a client include the computing device itself, another computing device, or any combination thereof.

The application layer 201 (e.g., the server(s) 219, the application(s) 210) can include any server, computing device, or technology capable of communicating or receiving data comprising address resolution information via a transmission. In one example, such a transmission can be a broadcast transmission or a multicast transmission. The address resolution information can comprise one or more of: (i) a link layer address (e.g., a MAC address); and (ii) an Internet layer address. The Internet layer address can include an IP address (e.g., an IPv4 address).

In one example, the server(s) 219 include one or more of a DHCP 208, an mDNS 209, an SDP (not shown in FIG. 2), or any other server or protocol that is associated with the application layer 201 and capable of communicating or receiving a broadcast or multicast transmission that includes, identifies, or implicates data comprising address resolution information. The application(s) 210 include any application that is associated with the application layer 201 and capable of communicating or receiving a broadcast or multicast transmission that includes, identifies, or implicates data comprising address resolution information. The application(s) 210 can include one or more technologies designed for an end user, such as software (e.g., one or more computer programs). One example of such an application 210 is a media streaming application.

In one example, one or more of the server(s) 219 (e.g., the DHCP 208, the mDNS 209) and the application(s) 210 receives or comprises data that includes, identifies, or implicates address resolution information of another computing device—e.g., a computing device that is not characterized or represented by the OSI model 200). The computing device can be a DHCP server associated with the DHCP 208, an mDNS server associated with the mDNS 209, one or more computing devices or servers associated with the application(s) 210, one or both of the IoT nodes 101, the gateway 103, or another computing device in the IoT system 100. The data received by or comprised in the server(s) 219 is referred to herein as server data. The data received by or comprised in the DHCP 208 is referred to herein as DHCP data. The data received by or comprised in the mDNS 209 is referred to herein as mDNS data. The data received by or comprised in the application(s) 210 is referred to herein as application data.

The computing device corresponding to the OSI model 200 (e.g., the IoT node 101A) processes or is configured to process one or more of the server data (e.g., DHCP data, mDNS data) and the application data to obtain or determine data comprising address resolution information of a computing device (e.g., the IoT node 101A, the IoT node 101B, the gateway 103, one or more of the servers 105). Other examples, however, are not so limited. For example, the computing device corresponding to the OSI model 200 (e.g., the IoT node 101A) processes or is configured to process one or more of the server data (e.g., DHCP data, mDNS data) and the application data to obtain or determine one or more of the following: (i) data comprising address resolution information of a computing device, as described above; (ii) one or more protocols used on or by the network (e.g., the intranet 113, the Internet 107) or the system (e.g., the IoT system 100); and (iii) any other data associated with the network (e.g., the intranet 113, the Internet 107) or the system (e.g., the IoT system 100).

In one example, and as shown in FIG. 2, the application layer 201 communicates one or more of the server data (e.g., the DHCP data, the mDNS data) and the application data to the data link layer 206. One or more of the servers 219 communicates the server data to the data link layer 206. For example, the DHCP 208 communicates the DHCP data to the data link layer 206. For another example, the mDNS 209 communicates the mDNS data to the data link layer 206. In one example, one or more of the applications 210 communicates application data to the data link layer 206. Communicating the server data (e.g., the DHCP data, the mDNS data) includes each of the layers 201-205 communicating the server data to the data link layer 206. Communicating the application data includes each of the layers 201-205 communicating the application data to the data link layer 206. Communicating the data described above can be performed using one or more broadcast transmissions or one or more multicast communications. In one example, the computing device corresponding to the OSI model 200 (e.g., the IoT node 101A) communicates, from the application layer 101 to the data link layer 206, the data that is obtained or determined from processing one or more of the server data and the application data. In other examples, the computing device corresponding to the OSI model 200 (e.g., the IoT node 101A) communicates, from the application layer 101 to the data link layer 206, one or more of: (i) the server data; (ii) the application data; and (iii) the data that is determined from processing one or more of the server data and the application data.

In one scenario, the data link layer 206 is associated with a cache 213 (e.g., an ARP cache) that is similar to or the same as the cache described above in connection with FIG. 1, any other suitable cache, any combination thereof). The computing device corresponding to the OSI model 200 (e.g., the IoT node 101A) processes the data received from the application layer 201. Such processing includes performing at least one deletion operation 215 to remove data from the cache 213 or at least one addition operation 216 to store data in the cache 213. In one example, and as shown in FIG. 2, the computing device corresponding to the OSI model 200 (e.g., the IoT node 101A) performs at least one addition operation 216 to store data (e.g., some or all of the data determined from processing one or more of the server data and the application data) in the cache 213. In one example, when the computing device corresponding to the OSI model 200 (e.g., the IoT node 101A) performs the one or more addition operations to store data in the cache 213, some or all of the data is stored in the cache 213 as one or more entries. In another example, the computing device corresponding to the OSI model 200 (e.g., the IoT node 101A) performs or is configured to perform one or more deletion operations 215 on at least some of the data described above to remove at least some of the data from the cache 213.

Another example of ARIA described herein begins at the transport layer 204, which includes one or more technologies (e.g., a TCP 211) that can, among others, provide or be configured to provide resources, data, services, or programs to a client. In one example, the TCP 211 receives or comprises data (e.g., one or more segments) that includes, identifies, or implicates address resolution information of a computing device (e.g., a TCP server, another server, an application, one or both of the IoT nodes 101, the gateway 103, or another computing device in the IoT system 100). The data received by or comprised in the TCP 211 is referred to herein as TCP data. In one example, the TCP data includes data that is representative of one or more errors resulting from prohibited, improper, incomplete, or failed transmissions of or requests for data (e.g., address resolution information) that is associated with one or more computing devices. The data included in the TCP data that is representative of the error(s) can be used to identify data comprising address resolution information of a computing device that is experiencing or affected by the error(s).

In one example, the data included in the TCP data that is representative of the error(s) includes one or more notifications about the error(s) described above. One example of such notifications includes a notification about one or more timeouts, one or more notifications of a closed connection that is associated with a computing device transmitting data to or receiving data from another computing device after the connection between the computing devices is closed, or any other notification(s) associated with prohibited, improper, failed, interrupted, or incomplete communications of data to or from a computing device. One example of a timeout includes a TCP timeout. In one example, the computing device corresponding to the OSI model 200 (e.g., the IoT node 101A) performs or is configured to perform data sniffing. In another example, the computing device corresponding to the OSI model 200 (e.g., the IoT node 101A) comprises or accesses a data sniffer that performs or is configured to perform data sniffing.

In one example, the computing device corresponding to the OSI model 200 (e.g., the IoT node 101A) or its data sniffer sniffs or is configured to sniff data flowing to or from the transport layer 204. The sniffed data can comprise one or more of TCP data, any other data flowing to or from the TCP 211 (e.g., one or more segments), one or more datagrams, any combination thereof. In one example, the sniffed data comprises TCP data that includes one or more segments. In one example, the sniffed data comprises TCP data that includes data that is representative of the one or more errors described above (e.g., one or more of the notifications described above). In one example, the computing device corresponding to the OSI model 200 (e.g., the IoT node 101A) processes or is configured to process the sniffed data to obtain or determine address resolution information (e.g., Internet layer addresses, MAC addresses) of one or more computing devices in the IoT system 100.

In one example, and as shown in FIG. 2, the transport layer 204 communicates the data described above (e.g., the TCP data, the data determined from the sniffed data, any combination thereof) to the data link layer 206. In one example, the TCP 211 communicates the data described above (e.g., TCP data) to the data link layer 206. Communicating the data described above, in one example, includes each of the layers 204-205 communicating the data described above to the data link layer 206. Communicating the data described above, in one example, can be performed using one or more unicast transmissions.

The computing device corresponding to the OSI model 200 (e.g., the IoT node 101A) processes data (e.g., the data determined from the sniffed data, the TCP data) received from the transport layer 204. Such processing may include performing at least one deletion operation 215 to remove data from the cache 213 or at least one addition operation 216 to store data in the cache 213. In one example, and as shown in FIG. 2, the computing device corresponding to the OSI model 200 (e.g., the IoT node 101A) performs at least one deletion operation 215 to delete data (e.g., the TCP data, the data determined from the sniffed data, any other data received from the transport layer 204, any combination thereof) from the cache 213. In another example, the computing device corresponding to the OSI model 200 (e.g., the IoT node 101A) can perform or be configured to perform one or more addition operations 216 to store data (e.g., the TCP data, the data determined from the sniffed data, any other data received from the transport layer 204, any combination thereof) in the cache 213.

In one example, when TCP data itself or the sniffed data comprises data representative of the one or more errors described above, the computing device corresponding to the OSI model 200 (e.g., the IoT node 101A) determines that some or all of the address resolution information implicated by the data representative of the one or more errors is stale, erroneous, or unusable. Accordingly, the computing device corresponding to the OSI model 200 (e.g., the IoT node 101A) performs or is configured to perform at least one deletion operation 215 to delete some or all of the stale, erroneous, or unusable address resolution information from the cache 213.

The network layer 205 includes one or more technologies (e.g., an Internet control message protocol (ICMP), any other protocol associated with the network layer 205 and capable of unicasting one or more communications) that may provide resources, data, services, or programs to a client (e.g., the computing device itself, another computing device, any combination thereof). In one example, the ICMP 212 receives or comprises data that includes, identifies, or implicates address resolution information that is associated with a computing device in the IoT system 100. The data received by or comprised in the ICMP 212 is referred to herein as ICMP data. In one example, the ICMP data includes data that is representative of one or more errors resulting from or associated with incomplete, erroneous, or failed transmissions of or requests for data (e.g., address resolution information) that is associated with a computing device (e.g., a server, an application, the gateway 103, one or both of the IoT nodes 101). The data that comprises or is representative of the error(s) can be used to identify data comprising address resolution information of a computing device that is experiencing or affected by the errors. In one example, the data included in the ICMP data that comprises or is representative of the error(s) described above includes one or more notifications about the error(s) described above. One example of such notifications includes a notification about one or more unreachable destinations, such as one or more ICMP Destination unreachable messages.

In one example, the computing device corresponding to the OSI model 200 (e.g., the IoT node 101A) or the data sniffer described above sniffs data flowing to or from the network layer 205 (e.g., the ICMP data, any other data carried by one or more data packets flowing to or from the ICMP 212). The computing device corresponding to the OSI model 200 (e.g., the IoT node 101A) processes at least some of the sniffed data to determine data, such as data comprising address resolution information of one or more computing devices (e.g., the IoT node 101A, the IoT node 101B, the gateway 103, one or more servers, one or more applications). The data identified by, acquired from, or determined from the sniffed data may include ICMP data, which can include data that comprises or is representative of the one or more errors described above.

In one example, and as shown in FIG. 2, the network layer 205 communicates data (e.g., the ICMP data, the data that is determined from the sniffed data, any combination thereof) to the data link layer 206. The ICMP 212 communicates at least some of the data described above (e.g., the ICMP data) to the data link layer 206. Communicating the data described above can be performed using one or more unicast transmissions.

The computing device corresponding to the OSI model 200 (e.g., the IoT node 101A) processes data (e.g., the ICMP data, the data that is determined from the sniffed data, any combination thereof) received from the network layer 205. Such processing includes, but is not limited to, performing at least one deletion operation 215 to remove data from the cache 213 or at least one addition operation 216 to store data in the cache 213. In one example, and as shown in FIG. 2, the computing device corresponding to the OSI model 200 performs at least one deletion operation 215 to delete data (e.g., the ICMP data, the data that is determined from the sniffed data, any other data associated with in the cache 213, any combination thereof) from the cache 213.

In one example, when the ICMP data itself or the sniffed data comprises data representative of the one or more errors described above, the computing device corresponding to the OSI model 200 (e.g., the IoT node 101A) determines that some or all of the address resolution information implicated by the data that is representative of the one or more errors is stale, erroneous, or unusable. Accordingly, the computing device corresponding to the OSI model 200 (e.g., the IoT node 101A) performs or is configured to perform at least one deletion operation 215 to delete some or all of the stale, erroneous, or unusable address resolution information from the cache 213.

The computing device corresponding to the OSI model 200 can implement an aging protocol. One example of an aging protocol is an aging protocol that is used in a traditional address resolution procedure (e.g., an aging protocol includes use of an ARP timeout). In one scenario, the cache 213 can include data 214 (e.g., address resolution information) that is flushed based on an aging protocol (e.g., an ARP aging protocol). The data 214 may be data that has been stored in the cache 213 for a predetermined amount of time and not used (e.g., not accessed, communicated, or sent to a computing device (e.g., the IoT node 101B, the gateway 103)). In one example, the computing device corresponding to the OSI model 200 comprises one or more technologies that perform at least one deletion operation 215 to remove the data 214 from the cache 213.

Deleting data from a cache (e.g., the cache 213) based on an aging protocol that is associated with a traditional address resolution procedure has at least one shortcoming in some scenarios. A traditional aging protocol can cause inefficient utilization of one or more of the resources of or accessible to a computing device (e.g., the computing device corresponding to the OSI model 200). Such resources include power, memory, and processing power. For example, the aging protocol may require the computing device corresponding to the OSI model 200 (e.g., the IoT node 101A) to remain operational for an extended period until the time required for deleting such entries elapses. For another example, the aging protocol may require the computing device corresponding to the OSI model 200 (e.g., the IoT node 101A) to store aging entries that have not been used for an extended period until the time required for deleting aging entries elapses. Reducing or eliminating the shortcomings described above is particularly important for computing devices (e.g., any one of IoT nodes 101, the gateway 103) that: (i) operate on low power (e.g., battery power); (ii) are expected to have a long lifespan (e.g., days, weeks, months, years); (iii) have a limited memory footprint; or (iv) have any other finite resources (e.g., processing power).

In one example of ARIA, the computing device corresponding to the OSI model 200 flushes the data 214 from cache 213 based on a data hierarchy. One example of flushing data from a cache based on data hierarchy is described above in connection with FIG. 1. In one example, the data 214 may comprise data that was opportunistically determined using one or more examples of ARIA described herein. In this example, the data 214 has a lower priority than data that has actually been used for or in communication(s)(e.g., some or all of the data acquired using a traditional address resolution procedure, some or all of the data communicated from the application layer 201, the transport layer 204, or the network layer 205 to the data link layer 206, any combination thereof). Furthermore, and in this example, a computing device corresponding to the OSI model 200 (e.g., any one of the IoT nodes 101, the gateway 103) performs the deletion operation(s) in response to the computing device determining that the cache 213 is full or that space is needed in the cache 213 to store additional data (e.g., additional address resolution information).

Figure 3:
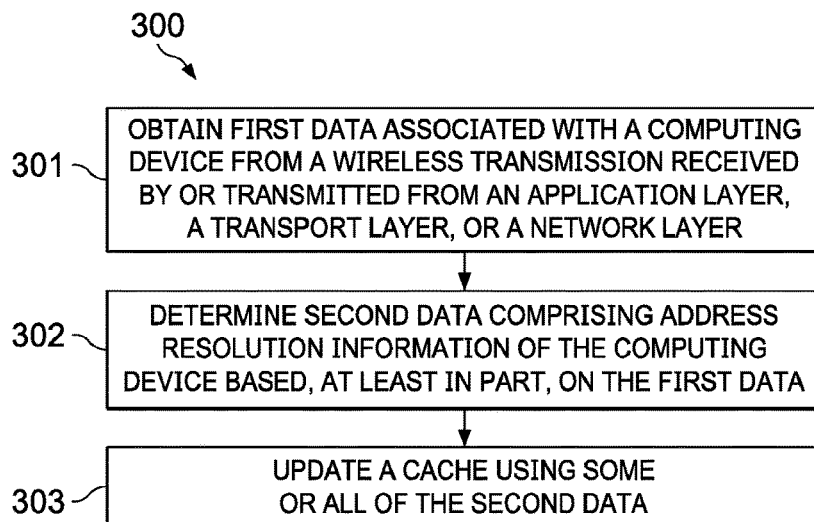
FIG. 3 is a flow chart illustrating one example of ARIA that includes determining address resolution of a computing device without use of an address resolution protocol (ARP) in accordance with some examples.

FIG. 3 illustrates a flow chart of one example of ARIA 300. The ARIA 300 can be performed by a computing device, such as any one of the computing devices described above in connection with FIGS. 1-2. In the description provided below in connection with FIG. 3, the first computing device that performs ARIA 300 can be the IoT node 101A, the IoT node 101B, the gateway 103, any other computing device in a system capable of communicating data (e.g., data packets) using one or more unicast transmissions, one or more broadcast transmissions, or one or more multicast transmissions. The one or more second computing devices differ from the first computing device and can be the IoT node 101A, the IoT node 101B, the gateway 103, any other computing device in a system capable of communicating data (e.g., data packets) using one or more unicast transmissions, one or more broadcast transmissions, or one or more multicast transmissions. The system can comprise one or more networks. In one example, the system described below in connection with FIG. 3 is the IoT system 100. The network(s) can comprise the intranet 113 or the Internet 107.

The ARIA 300 begins at operation 301 in which the first computing device acquires a first set of data associated with one or more second computing devices in the system from a wireless transmission received by or transmitted from an application layer 201, a transport layer 204, or a network layer 205 of the OSI model 200 that is representative of or characterizing the first computing device. In ARIA 300, the first data is obtained from the application layer 201, the transport layer 204, or the network layer 205 for the purpose of determining address resolution information. Accordingly, the ARIA 300 differs from traditional address resolution procedures (e.g., an ARP), which use communications to or from the data link layer 206 to determine address resolution information.

In one example, the first computing device acquires the first set of data from one or more transmissions that are communicated in the system. Acquiring the first set of data can take many forms as described above in connection with FIGS. 1-2 and below in connection with FIGS. 4-7. For example, acquiring the first set of data can comprise the first computing device receiving one or more transmissions comprising data associated with one or more second computing devices and acquiring the first set of data from the received transmission(s). Another example includes the first computing device data sniffing one or more transmissions to or from one or more second computing devices and acquiring the first set of data from the sniffed transmission(s). An additional example includes the first computing device communicating one or more transmissions to one or more second computing devices, receiving data characterizing the transmission(s), and acquiring the first set of data from processing the data that characterizes the transmission(s). The data characterizing the transmission(s) may comprise data representative of: (i) a state of the transmission(s); or (ii) an error associated with the transmission(s). The state of the transmission(s) ca, for example, indicate a success or failure of the transmission(s) failed to reach their intended destination even though there are no errors affecting the transmission(s). The error associated with the transmission(s) can be similar to or the same as the errors described above in connection with FIGS. 1-2. For example, the error can be similar to or the same as one or more of the errors associated with the transport layer 204 or the network layer 205, which are described above in connection with FIG. 2.

The ARIA 300 moves on to operation 302. Here, the first computing device determines a second set of data comprising address resolution information of at least one of the one or more second computing devices. This determination is based, at least in part, on the first computing device processing the first data. At least one example of determining data that comprises address resolution information is described above in connection with FIGS. 1-2.

Next, ARIA proceeds to operation 303. Here, the first computing device updates a cache using some or all of the data comprising the address resolution information. This operation includes storing or deleting some or all of the data comprising the address resolution information to or from a cache of the first computing device, respectively. A cache of the first computing device is a cache that is accessible to or residing in the first computing device. At least one example of updating a cache as part of ARIA is described above in connection with FIGS. 1-2.

Figure 4:
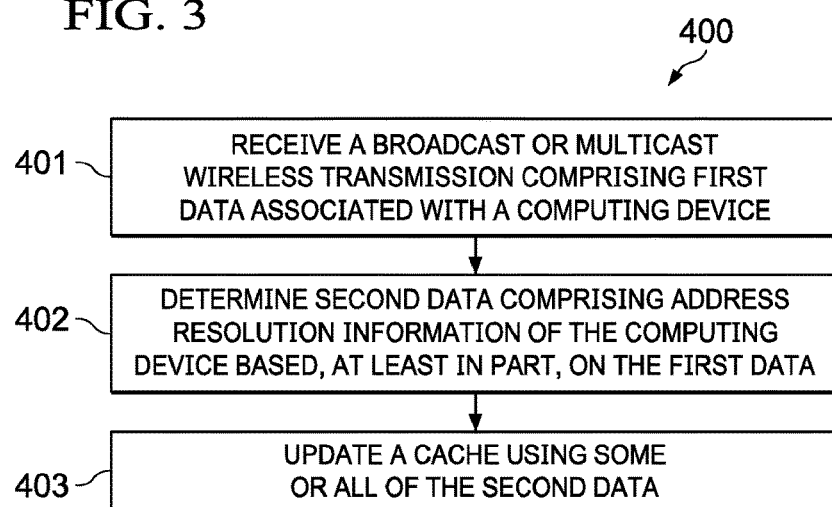
FIG. 4 is a flow chart illustrating another example of ARIA in accordance with some examples.

FIG. 4 illustrates a flow chart of ARIA 400 in accordance with some examples. The ARIA 400 shown in FIG. 4 is an example of ARIA shown in FIG. 3. The ARIA 400 can be performed by a computing device, such as any one of the computing devices described above in connection with FIGS. 1-2. In the description provided below in connection with FIG. 4, the first computing device that performs ARIA 400 can be the IoT node 101A, the IoT node 101B, the gateway 103, any other computing device in a system capable of receiving data (e.g., data packets) from one or more broadcast transmissions or one or more multicast transmissions. The second computing device differs from the first computing device and can be the IoT node 101A, the IoT node 101B, the gateway 103, any other computing device in a system capable of communicating data (e.g., data packets) using one or more broadcast transmissions or one or more multicast transmissions. The third computing device differs from each of the first and second computing devices and can be the IoT node 101A, the IoT node 101B, the gateway 103, any other computing device in a system or network capable of communicating data (e.g., data packets) using one or more broadcast transmissions or one or more multicast communications. The system can comprise one or more networks. The system can be the IoT system 100. The network(s) can comprise the intranet 113 or the Internet 107.

The ARIA 400 begins at operation 401 in which a first computing device that is in a system receives a transmission comprising data from a computing device that is in the system. In one example, the transmission is broadcast or multicast to the first computing device from another computing device in the system (e.g., the second computing device, a third computing device). In one example, the transmission is broadcast or multicast to an application layer of the first computing device. The transmission may be broadcast or multicast as part of a service discovery procedure. Operation 401 is similar to or the same as one or more operations described above in connection with FIGS. 1-2. The operations described above in connection with FIGS. 1-2 are directed to communicating data between computing devices in a system.

Next, ARIA 400 proceeds to operation 402, where the first computing device determines data comprising address resolution information from at least some of the data that was broadcast or multicast to the first computing device. In one example, the address resolution information is associated with a second computing device. Operation 402 is, in one example, similar to or the same as one or more operations described above in connection with FIGS. 1-2. One or more of these operations is directed to obtaining or determining data comprising address resolution information from one or more transmissions that are broadcast or multicast to a computing device. The ARIA 400 moves on to operation 403 in which the first computing device updates its cache using the data comprising the address resolution information. For example, the first computing device adds or deletes some or all of the data comprising the address resolution information that is associated with the second computing device to or from a cache, respectively. Operation 403 is similar to or the same as one or more addition operations described above in connection with FIGS. 1-2.

Figure 5:
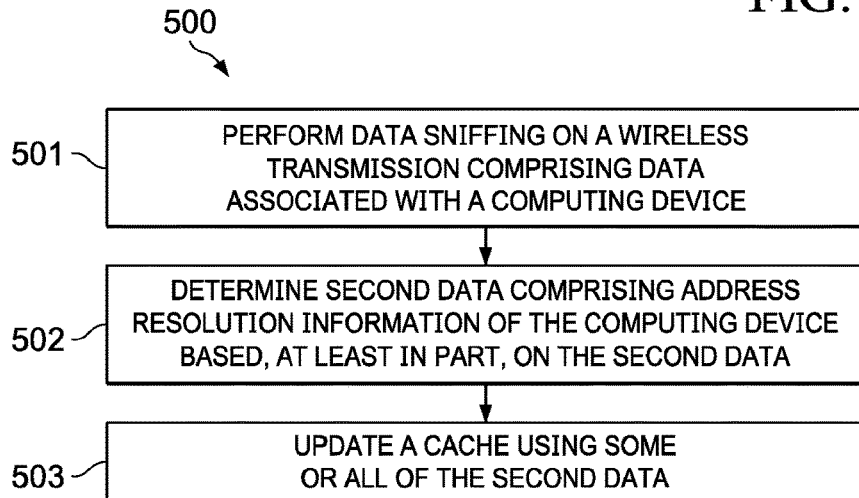
FIG. 5 is a flow chart illustrating yet another example of ARIA in accordance with some examples.

FIG. 5 illustrates a flow chart of ARIA 500 in accordance with some examples. The ARIA shown in FIG. 5 is an example of ARIA shown in FIG. 3. The ARIA 500 can be performed by a computing device, such as any one of the computing devices described above in connection with FIGS. 1-2. In the description provided below in connection with FIG. 5, the first computing device that performs ARIA 500 can be the IoT node 101A, the IoT node 101B, the gateway 103, any other computing device in a system capable of communicating data using one or more unicast, broadcast, or multicast communications. The second computing device, which differs from the first computing device, can be the IoT node 101A, the IoT node 101B, the gateway 103, any other computing device in a system capable of communicating data using one or more unicast, broadcast, or multicast communications. The third computing device, which differs from each of the first and second computing devices, can be the IoT node 101A, the IoT node 101B, the gateway 103, any other computing device in a system capable of communicating data using one or more unicast, broadcast, or multicast communications, or any combination thereof. The system, which can comprise one or more networks, can be the IoT system 100. The network(s) can comprise the intranet 113 or the Internet 107.

The ARIA 500 begins at operation 501 in which a first computing device that is in a system data sniffs one or more transmissions within the system that are directed to one or more other computing devices in the system (e.g., a second computing device, a third computing device). The one or more transmissions comprise data that is communicated to or from the one or more other computing devices (e.g., a second computing device, a third computing device). The one or more transmissions can, in one example, include one or more unicast transmissions, one or more broadcast transmissions, or one or more multicast transmissions. In one example, the first computing device performs data sniffing on data flowing to or from a transport layer or a network layer of the first computing device. Operation 501 is similar to or the same as one or more sniffing operations described above in connection with FIGS. 1-2.

Next, ARIA 500 proceeds to operation 502 in which the first computing device determines, from at least some of the sniffed data, data comprising address resolution information that is associated with the second computing device or the third computing device. Examples of one or more operations directed to determining, from sniffed data, data comprising address resolution information that is associated with a computing device in a system are described above in connection with FIGS. 1-2. At operation 503, ARIA 500 includes the first computing device updating its cache using some or all of the data comprising the address resolution information. Such an update includes the first computing device adding or deleting some or all of the data comprising the address resolution information that was determined in operation 502 to or from a cache, respectively. The operation 503 is, in one example, similar to or the same as one or more of the addition and deletion operations described above in connection with FIGS. 1-2.

Figure 6:
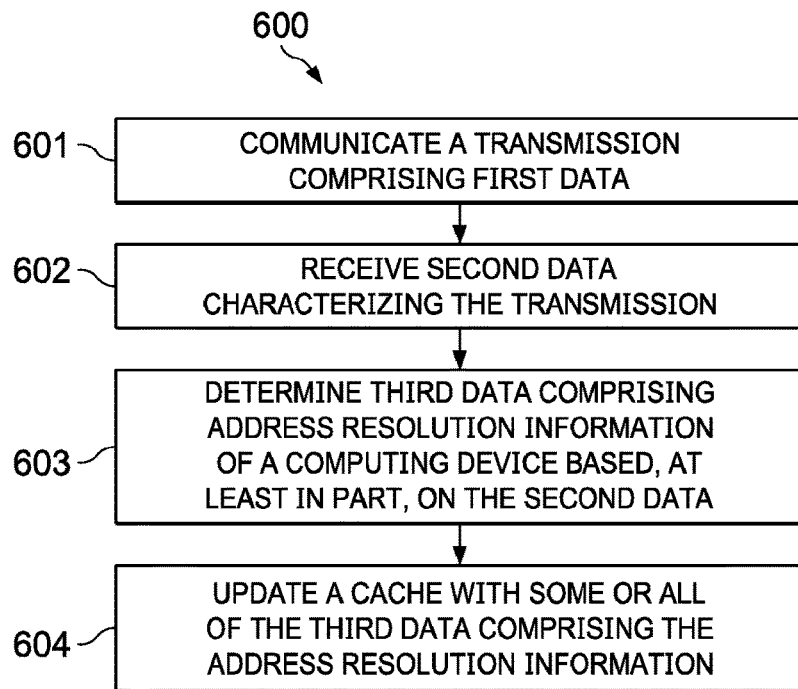
FIG. 6 is a flow chart illustrating one more example of ARIA in accordance with some examples.

FIG. 6 is an illustration of a flow chart of yet ARIA 600, in accordance with some examples. The ARIA shown in FIG. 6 is an example of ARIA shown in FIG. 3. The ARIA 600 can be performed by a computing device, such as any one of the computing devices described above in connection with FIGS. 1-2. In the description provided below in connection with FIG. 6, the first computing device that performs ARIA 500 can be the IoT node 101A, the IoT node 101B, the gateway 103, any other computing device in a system capable of communicating data using one or more unicast, broadcast, or multicast transmissions. The second computing device differs from the first computing device and can be the IoT node 101A, the IoT node 101B, the gateway 103, any other computing device in a system capable of communicating data using one or more unicast, broadcast, or multicast transmissions, or any combination thereof. The system, which can comprise one or more networks, can be the IoT system 100. The network(s) can comprise the intranet 113 or the Internet 107.

The ARIA 600 begins at operation 601 in which a first computing device that is in the system communicates one or more transmissions comprising data in the network or system. In one example, a second computing device receives at least one of the transmission(s). The second computing device may or may not be the intended recipient of some or all of the transmission(s). In one example, the one or more transmissions comprise one or more unicast communications, as described above in connection with FIGS. 1-2. In one example, when the communication(s) described above comprises one or more unicast transmissions, such communication(s) are based, at least in part, on one or more protocols that include a TCP or an ICMP. That is, the transmissions originate from the transport layer 204 or the network layer 205. The ICMP can include: (i) ICMPv4, which is a version of the ICMP that is used with IP version 4 (IPv4); or (ii) ICMPv6, which is a version of the ICMP that is used with IP version 6 (IPv6). In one example, at least one of the protocol(s) described above are implemented by one or more servers (e.g., a TCP server, an ICMP server). Operation 601 is similar to or the same as one or more of the operations described above in connection with FIGS. 1-2, which include communicating data using transmissions (e.g., one or more unicast communications) between two computing devices.

Next, at operation 602, the first computing device receives, in response to receiving the communication(s) described above, data representative of one or more states of the transmission(s). In one example, the data described above in connection with operation 602 is communicated by the second computing device and received by the first computing device. In another example, the data described above in connection with operation 602 is communicated from one or more of the second computing device and at least one third computing device. Such data can include TCP data or ICMP data. Examples of this type of data are described above in connection with FIGS. 1-2. In one example, the data received by the first computing device is representative of the one or more errors associated with the transmission(s) received by the second computing device. In one example, the data that is representative of the error(s) includes data that comprises one or more notifications about the error(s) that are associated with transmission(s) received by the second computing device. Examples of such notifications are described above in connection with FIGS. 1-2.

The ARIA 600 moves on to operation 603 in which the first computing device determines data comprising address resolution information that is associated with one or more of the second computing device and at least one third computing device. This determination is made based, at least in part, on the data characterizing one or more states of the transmission(s). For example, the first computing device processes the received data to obtain or determine the data comprising the address resolution information described above. In one example, the first computing devices determines the data comprising the address resolution information based, at least in part, on some or all of the data comprising or representing the one or more errors described above. Operation 603 is similar to or the same as one or more operations described above in connection with FIGS. 1-2, which include determining address resolution information from data characterizing one or more transmissions communicated between two or more computing devices.

The ARIA 600 also includes operation 604 in which the first computing device updates a cache using some or all of the data comprising the address resolution information. For such an update, the first computing device adds or deletes some or all of the data comprising the address resolution information described above in connection with operation 603 to or from a cache of the first computing device, respectively. In one example, operation 604 includes the first computing device determining that some or all of data comprising the address resolution information that is implicated by the data that is representative of the one or more errors is stale, erroneous, or unusable. In this example, the first computing device performs at least one deletion operation to delete some or all of the stale, erroneous, or unusable data from a cache of the first computing device. Operation 604 is similar to or the same as one or more operations described above in connection FIGS. 1-2, which include adding or deleting some or all of the determined address resolution information from a cache.

Figure 7:
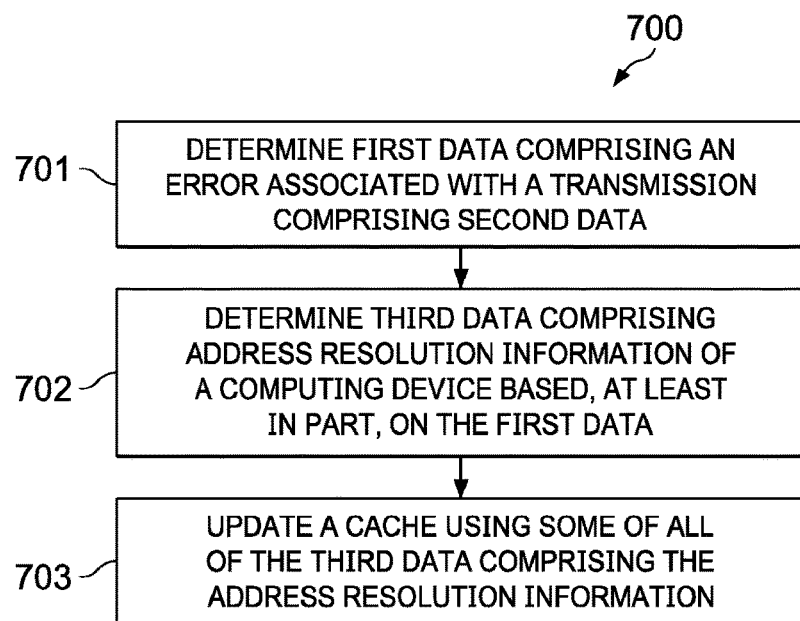
FIG. 7 a flow chart illustrating an additional example of ARIA in accordance with some examples.

FIG. 7 is an illustration of a flow chart of an ARIA 700 that includes updating a cache associated with ARIA 700. The ARIA 700 shown in FIG. 7 is an example of the ARIA shown in FIG. 3. The ARIA 700 can be performed by a computing device, such as any one of the computing devices described above in connection with FIGS. 1-2. In the description provided below in connection with FIG. 7, the first computing device that performs ARIA 700 can be the IoT node 101A, the IoT node 101B, the gateway 103, any other computing device in a system capable of communicating data using one or more unicast, broadcast, or multicast transmissions. The second computing device differs from the first computing device and can be the IoT node 101A, the IoT node 101B, the gateway 103, any other computing device in a system capable of communicating data using one or more unicast, broadcast, or multicast transmissions. The system, which can comprise one or more networks, can be the IoT system 100. The network(s) can comprise the intranet 113 or the Internet 107.

The procedure 700 begins at operation 701 in which a first computing device that is in a system determines data representative of one or more errors that are associated with one or more transmissions in the system. In one example, the one or more transmissions comprise data. The one or more transmissions can, in one example, include one or more unicast transmissions, one or more broadcast transmissions, or one or more multicast transmissions. In one example, the one or more transmissions are directed to or from a second computing device in the system. Operation 701 is similar to or the same as one or more operations that are described above in connection with FIGS. 1-2. The operation(s) described above in connection with FIGS. 1-2 are directed to, among others, determining one or more errors that are associated with communicating data between computing devices in a network or system.

Next, ARIA 700 proceeds to operation 702 in which the first computing device determines data comprising address resolution information that is associated with one or more of the second computing device and at least one third computing device. This determination is based, at least in part, on data that is representative of the one or more errors. Operation 702 is similar to or the same as one or more operations that are described above in connection with FIGS. 1-2. The operation(s) described above in connection with FIGS. 1-2 are directed to, among others, determining address resolution information that is associated with at least one computing device in a system from one or more errors that are associated with communicating data between two or more computing devices in the system. The ARIA 700 subsequently proceeds to operation 703. At this operation, the first computing device deletes some or all of the data comprising the address resolution information described above in connection with operation 702 from a cache of the first computing device. Operation 703 is similar to or the same as one or more of the deletion operations described above in connection with FIGS. 1-2.

Figure 8:
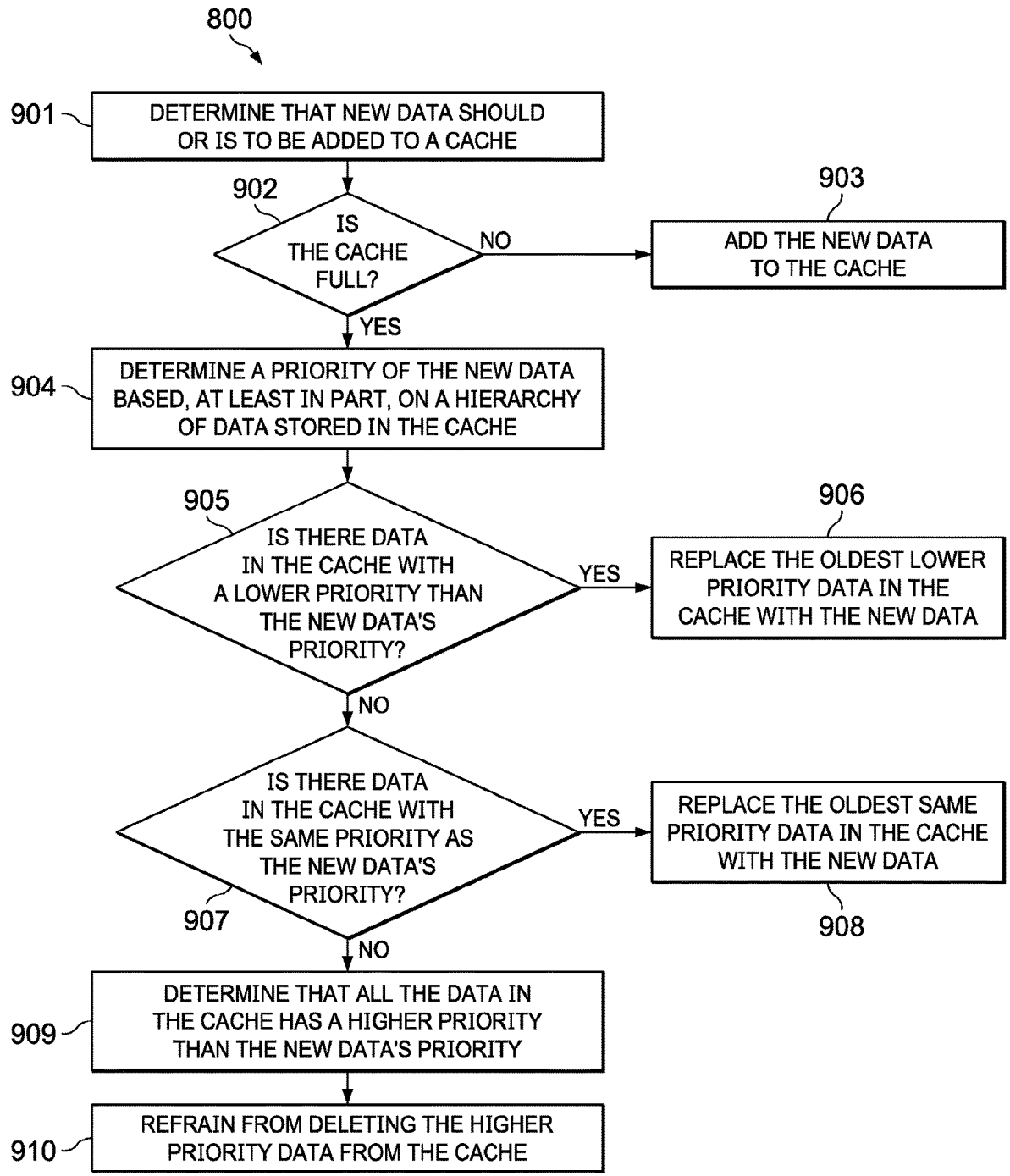
FIG. 8 is a flow chart illustrating a process of updating a cache in accordance with some examples of ARIA.

FIG. 8 illustrates a flow chart of a process 800 of updating a cache in accordance with some examples. The process 800 shown in FIG. 8 can be used as part of one or more examples of ARIA described above in connection with FIGS. 1-7. The process 800 can be performed by a computing device, such as any one of the computing devices described above in connection with FIGS. 1-2. For example, the computing device that performs or is configured to perform the process 800 can be the IoT node 101A, the IoT node 101B, the gateway 103, or any other computing device in a system capable of communicating data using one or more unicast, broadcast, or multicast transmissions. The system, which can comprise one or more networks, can be the IoT system 100. The network(s) can comprise the intranet 113 or the Internet 107.

The process 800 begins at operation 801 in which the computing device determines that a memory (e.g., a cache) of the computing device should or is to be flushed. In one example, the computing device makes this determination in response to the computing device determining that the cache is full or that there is not enough space in the cache for additional data to be stored in the cache. One or more examples of operation 801 are described above in connection with FIGS. 1-2.

The process 800 moves on to operation 802. Here, the computing device identifies some data in the cache as a candidate for deletion. In one example, the identified data is randomly selected. In one example, the identified data is determined based on a data hierarchy, e.g., the data hierarchy described above in connection with FIGS. 1-2. Next, the process 800 proceeds to operation 803 in which the computing device determines whether the identified data includes high priority data. At least one example of high priority data is described above in connection with FIGS. 1-2.

If the identified data does not include high priority data, the process 800 moves on to operation 804. Here, the computing device deletes some or all of the identified data from the cache using one or more of the deletion operations described above in connection with FIGS. 1-2. On the other hand, if the identified data includes high priority data, the process 800 moves on to operation 805. The computing device performs operation 805 by determining whether there is other data in the cache that is not high priority data. Examples of this other data are described above in connection with FIGS. 1-2.

If all the data in the cache is high priority data, the process 800 moves to operation 804. Here, the computing device deletes some or all of the identified data using one or more of the deletion operations described above in connection with FIGS. 1-2. On the other hand, if there is data that is not high priority data in the cache, the process 800 moves operation 806. Here, the computing device deletes some or all of the data that is not high priority data from the cache using one or more of the deletion operations described above in connection with FIGS. 1-2.

Each of ARIAs 300, 400, 500, 600, 700, and 800 described above in connection with FIGS. 3, 4, 5, 6, 7, and 8, respectively, have several benefits over traditional address resolution procedures. For example, one or more examples of ARIA 300, 400, 500, 600, 700, and 800 can assist with optimizing usage of a cache that is associated with one or more examples of ARIAs described herein. Examples of optimization techniques associated with one or more of the examples of ARIAs described herein are described above in connection with FIGS. 1-2. Furthermore, and in one example, one or more examples of ARIA 300, 400, 500, 600, 700, and 800 can assist with or enable acquisition of address resolution information that is associated with a computing device (e.g., an IoT node, a gateway) in a system (e.g., the IoT system 100) without use of an ARP or a traditional address resolution procedure. In some examples, one or more examples of ARIA 300, 400, 500, 600, 700, and 800 can assist with or provide a more efficient or optimal way of obtaining address resolution information that is associated with battery powered computing devices in a system. In another example, one or more examples of ARIA 300, 400, 500, 600, 700, and 800 can assist with or provide a more efficient or optimal way of obtaining address resolution information of computing devices in a system that have limited memory footprints. In yet another example, one or more examples of ARIA 300, 400, 500, 600, 700, and 800 can assist with or provide a more efficient way of obtaining address resolution information of a large amount of computing devices in a dense network or system.

One or more examples of ARIA described herein translates an Internet layer address into a link layer address. In one scenario, any one of the examples of ARIA described above in connection with FIGS. 1-8 translates an IPv4 address, an IPv6 address, or any other IP address into a MAC address.

Figure 9:
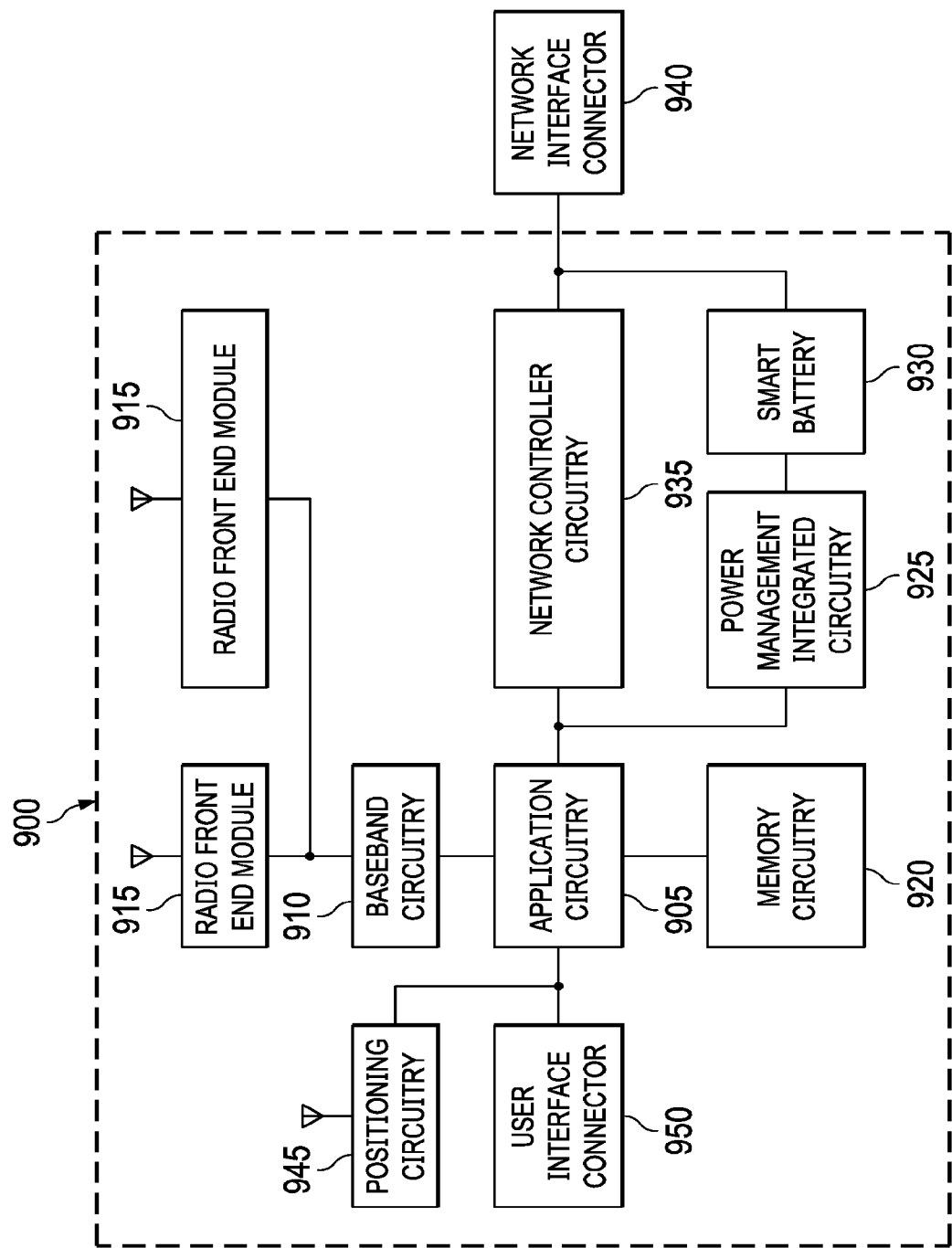
FIG. 9 is an illustration of a computing device in accordance with some examples.

FIG. 9 is an illustration of a computing device 900 in accordance with some examples. The computing device 900 may implement any, some, or all of the computing devices or technologies described above in connection with one or more of the preceding FIGS. 1-8 (e.g., any one of the IoT nodes 101A, the gateway 103, any one of the computing devices 109A-109B) and/or any other element/device discussed herein. The computing device 900 may include one or more of application circuitry 905, baseband circuitry 910, one or more radio front end modules 915, memory circuitry 920, power management integrated circuitry (PMIC) 925, power circuitry 930, network controller circuitry 935, network interface connector 940, satellite positioning circuitry 945, and user interface 950. In some examples, the computing device 900 may include additional elements such as, for example, memory/storage, display, camera, sensor, or input/output (I/O) interface. In other examples, the components described below may be included in more than one device. That is, the computing device 900 may be spread across multiple devices.

As used herein, the term "circuitry" may refer to, is part of, or includes hardware components such as an electronic circuit, a logic circuit, a processor (shared, dedicated, or group) and/or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), that are configured to provide the described functionality. In some examples, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these examples, the combination of hardware elements and program code may be referred to as a particular type of circuitry.

The terms "application circuitry" and/or "baseband circuitry" may be considered synonymous to, and may be referred to as, "processor circuitry," "processing circuitry," and their variations. As used herein, the terms "processor circuitry," "processing circuitry," and their variations may refer to, be part of, or include circuitry capable of sequentially and automatically carrying out a sequence of arithmetic or logical operations, or recording, storing, and/or transferring digital data. The "processor circuitry," "processing circuitry," and their variations may comprise one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the terms "network element," "communication circuitry," and their variations may describe physical or virtualized equipment used to provide wired or wireless communication network services. The terms "network element," "communication circuitry," and their variations may comprise one or more of a networked computer, networking hardware, network equipment, network node, router, switch, hub, bridge, radio network controller, node (e.g., an IoT node), gateway, server, virtualized virtual network function (VNF), network functions virtualization infrastructure (NFVI), and/or the like.

Application circuitry 905 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. In some examples, the computing device 900 may not utilize application circuitry 905, and instead may include a special-purpose processor/controller to process IP data received from a network (e.g., a network designed in accordance with the 802.1 lax protocol, a network designed in accordance with any of the other 802.11 protocols, a network described above in connection with FIGS. 1-8).

Additionally or alternatively, application circuitry 905 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such examples, the circuitry of application circuitry 905 may comprise logic blocks or logic fabric, and other interconnected resources that may be programmed to perform various functions, such as the procedures, methods, functions of the various examples discussed herein (e.g., performance of one or more examples of ARIAs described herein). In such examples, the circuitry of application circuitry 905 may include memory cells (e.g., erasable programmable read-only memory (EPROM), electrically erasable programmable read-only memory (EEPROM), flash memory, static memory (e.g., static random-access memory (SRAM), anti-fuses)) used to store logic blocks, logic fabric, data in look-up-tables (LUTs) and the like.

The baseband circuitry 910 may be implemented, for example, as a solder-down substrate including one or more integrated circuits (ICs), a single packaged IC soldered to a main circuit board or a multi-chip module containing two or more ICs. Although not shown, baseband circuitry 910 may comprise one or more digital baseband systems, which may be coupled via an interconnect subsystem to a central processing unit (CPU) subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In some examples, the baseband circuitry 910 may include protocol processing circuitry with one or more instances of control circuitry (not shown) to provide control functions for the digital baseband circuitry and/or radio frequency circuitry (e.g., the radio front end modules 915).

User interface circuitry 950 may include one or more user interfaces designed to enable user interaction with the computing device 900 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device Peripheral component interfaces may include, but are not limited to, a nonvolatile memory port, a universal serial bus (USB) port, an audio jack, a power supply interface The radio front end modules (RFEMs) 915 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 915. The RFEMs 915 may incorporate both millimeter wave antennas and sub-millimeter wave antennas. In one example, one or more of the RFEMs 915 transmits one or more communications comprising data, where the one or more communications are generated by the application circuitry 905. Examples of such communications are described above in connection with FIGS. 1-8. In one example, the communicated data comprises or is representative of address resolution information associated with one or more computing devices. Examples of such computing device include the computing device 900, the IoT node 101A, the IoT node 101B, the gateway 103, any one of the computing devices 109A-109B, any other computing device in a network (e.g., the intranet 113, the Internet 107) or a system (e.g., the IoT system 100), or any combination thereof.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power circuitry 930 may provide for electrical power drawn from a network cable to provide both power supply and data connectivity to the computing device 900 using a single cable.

The network controller circuitry 935 may provide connectivity to a network (e.g., a network designed in accordance with the 802.1 lax protocol, a network designed in accordance with any one of the 802.11 protocols, the intranet 113, the Internet 107, any combination thereof) using a standard network interface protocol such as Ethernet, Ethernet over GRE Tunnels, Ethernet over Multiprotocol Label Switching (MPLS), or some other suitable protocol. Network connectivity may be provided to/from the computing device 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The positioning circuitry 945 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), or the like. The positioning circuitry 945 may comprise various hardware elements (e.g., including hardware devices such as switches, filters, amplifiers, antenna elements, and the like to facilitate over-the-air (OTA) communications) to communicate with components of a positioning network, such as navigation satellite constellation nodes.

The components shown in FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Communication circuitry and/or processing circuitry may comprise interface circuitry. In one example, processing circuitry may be coupled to communication circuitry. In this example, the combination of the processing and communication circuitries can be used to perform: (i) a traditional address resolution information procedure; (ii) one or more example of ARIA described above in connection with one or more FIGS. 1-8; or (iii) any combination thereof.

Figure 10:
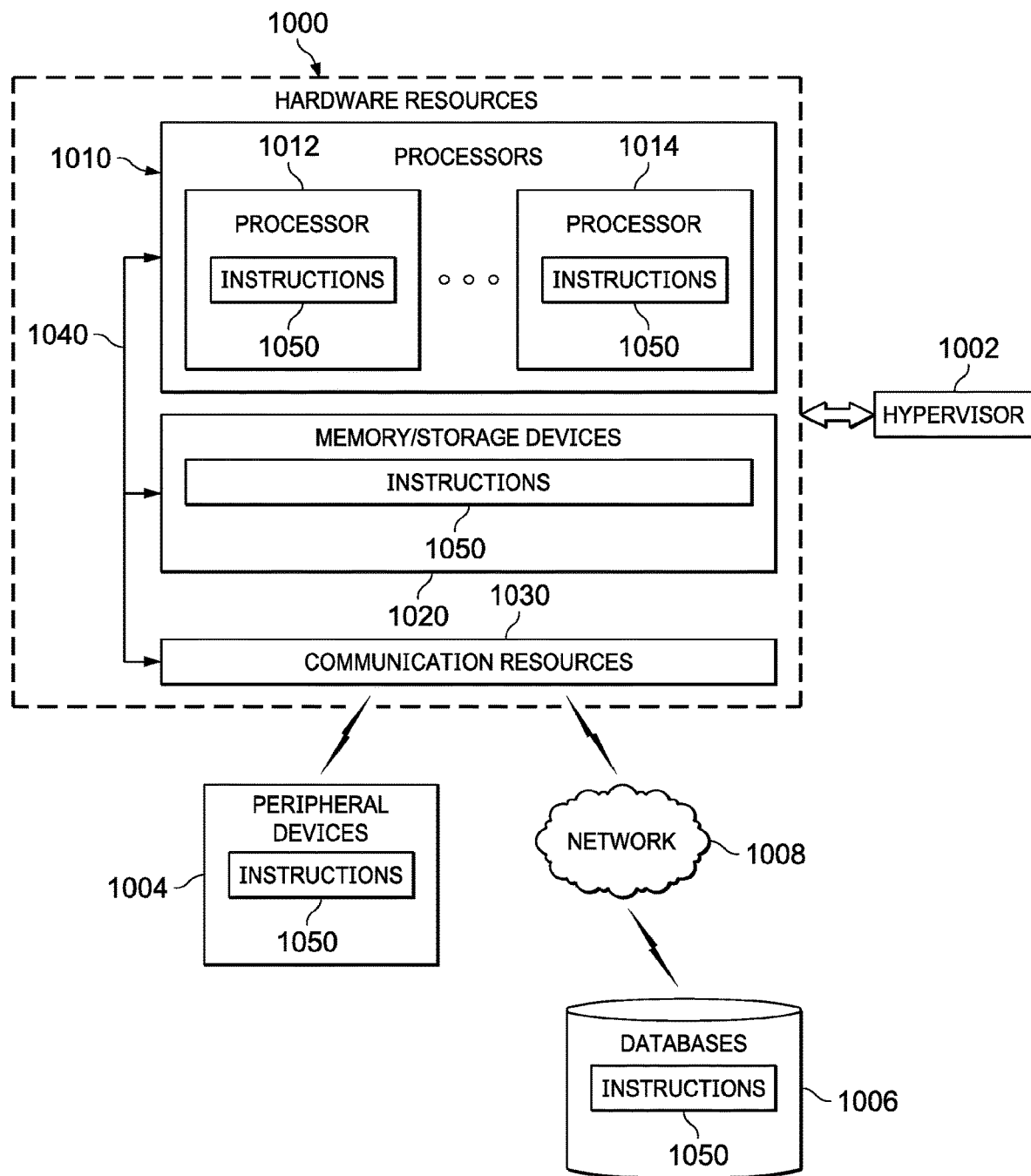
FIG. 10 is an illustration of components of a computing device in accordance with some examples.

FIG. 10 is a block diagram illustrating components, according to some examples, able to read instructions from a machine-readable or computer-readable medium (e.g., a non-transitory machine-readable storage medium) and perform any one or more of the methodologies or techniques discussed herein (e.g. one or more examples of ARIAs described above in connection with FIGS. 1-9). Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource," "hardware resource," may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For examples where node virtualization (e.g., NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to, any type of volatile or nonvolatile memory such as dynamic random-access memory (DRAM), static random-access memory (SRAM), erasable programmable read-only memory (EPROM), electrically erasable programmable read-only memory (EEPROM), Flash memory, solid-state storage The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies or techniques discussed herein. For example, the instructions 1050 may comprise executable code that enables performance of one or more examples of ARIAs described above in connection with FIGS. 1-9. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

At least one of the components set forth in one or more of the preceding figures may be configured to perform one or more operations, techniques, processes, and/or methods as set forth in the examples discussed herein. For example, the baseband circuitry as described above in connection with one or more of the preceding figures may be configured to operate in accordance with one or more of the examples discussed herein. For another example, circuitry associated with a node (e.g., an IoT node), a network element (e.g., a gateway), any other computing device capable of communicating data (e.g., one or more segments, one or more datagrams, one or more data packets, one or more frames, one or more symbols) using one or more broadcast communications, one or more multicast communications, one or more unicast communications as described above in connection with one or more of the preceding figures may be configured to operate in accordance with one or more of the examples discussed herein.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors. Furthermore, the use of "A or B," "A and/or B," "A and B," "at least one of A or B," "at least one of A and B," "A/B," or "one or more of A and B" is intended to mean A alone, B alone, or A and B together.

The description may use the phrases "in an example," "in examples," "in another example," "in other examples," "in some examples," and the like, which may each refer to one or more of the same or different examples. Furthermore, the terms "comprising," "including," "having," and the like, as used with respect to examples described herein, are synonymous.

As used herein, the phrases "A or B," "A and/or B," "AB," "at least one of A or B," "at least one of A and B," "one or more of A and B," "one or more of A or B," and mean (A), (B), or (A and B).

Modifications are possible in the described examples, and other examples are possible, within the scope of the claims.

What is claimed is:

1. A method comprising:
receiving a first transmission comprising first data;
determining first address resolution information associated with a first device based on the first data;
in response to determining that a cache having a plurality of entries storing address resolution information is full, determining a priority of the first address resolution information; and
in response to determining that a first entry of the plurality of entries has lower priority than the first address resolution information, replacing the first entry with the first address resolution information.

2. The method of claim 1, further comprising, in response to determining that the cache does not comprises an entry with lower priority than the priority of the first resolution address information, and in response to determining that a second entry has a same priority as the priority the first address resolution information, replacing the second entry with the first address resolution information.

3. The method of claim 2, wherein the second entry is an oldest entry of the cache with the same priority as the priority of the first address resolution information.

4. The method of claim 1, further comprising, in response to determining that the cache does not comprises an entry with lower priority than the priority of the first resolution address information, refrain from deleting an entry of the cache.

5. The method of claim 1, wherein receiving the first transmission comprising the first data comprises sniffing a transmission communicated between a second device and a third device, wherein the first device is different from the second and third devices.

6. The method of claim 5, wherein the second device is a gateway.

7. The method of claim 1, wherein the first entry is an oldest entry of the cache with lower priority than the priority of the first address resolution information.

8. The method of claim 1, wherein determining the priority of the first address resolution information is based on whether the first address resolution information is acquired opportunistically.

9. The method of claim 8, wherein determining whether the first address resolution information is acquired opportunistically comprises determining whether the first address resolution information using sniffing of a transmission.

10. The method of claim 1, wherein receiving the first transmission comprises receiving a wireless transmission.

11. The method of claim 1, wherein the first address resolution information associates an Internet layer address with a link layer address.

12. The method of claim 11, wherein the Internet layer address is an IPv4 or IPv6 address.

13. The method of claim 11, wherein the link layer address is a medium access control (MAC) address.

14. The method of claim 1, wherein the first transmission comprises transmission control protocol (TCP) data.

15. The method of claim 1, wherein the first transmission is a unicast transmission.

16. The method of claim 1, wherein the first transmission is a broadcast or multicast transmission.

17. The method of claim 1, further comprising:
determining whether the cache is to be flushed;
identify second entry of the plurality of entries for deletion based on a priority of the second entry; and
deleting the second entry from the cache.

18. The method of claim 17, wherein determining that the cache is to be flushed comprises determining that the cache is full.

19. The method of claim 17, wherein determining that the cache is to be flushed comprises determining that a number of low priority entries of the plurality of entries exceeds a predetermined threshold.

20. The method of claim 17, wherein determining that the cache is to be flushed comprises determining that a number of high priority entries of the plurality of entries falls below a predetermined threshold.

21. The method of claim 17, wherein determining that the cache is to be flushed comprises determining an occurrence of an error associated with communicating data.

22. The method of claim 21, wherein determining the occurrence of an error associated with communicating data comprises determining a transmission of erroneous or incomplete data between devices.

23. The method of claim 21, wherein determining the occurrence of an error associated with communicating data comprises determining an interruption of communication between devices.

* * * * *